(12) United States Patent
Pelletier et al.

(10) Patent No.: US 9,854,608 B2
(45) Date of Patent: Dec. 26, 2017

(54) METHOD AND APPARATUS FOR OBTAINING UPLINK TIMING ALIGNMENT ON A SECONDARY CELL

(71) Applicant: InterDigital Patent Holdings, Inc., Wilmington, DE (US)

(72) Inventors: Ghyslain Pelletier, Laval (CA); Paul Marinier, Brossard (CA); Sung-Hyuk Shin, Northvale, NJ (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/732,200

(22) Filed: Jun. 5, 2015

(65) Prior Publication Data

US 2015/0271854 A1  Sep. 24, 2015

Related U.S. Application Data

(63) Continuation of application No. 13/468,709, filed on May 10, 2012, now abandoned.

(60) Provisional application No. 61/484,591, filed on May 10, 2011.

(51) Int. Cl.
*H04W 74/08* (2009.01)
*H04W 56/00* (2009.01)

(52) U.S. Cl.
CPC ... *H04W 74/0833* (2013.01); *H04W 56/0005* (2013.01); *H04W 74/0891* (2013.01); *H04W 56/0045* (2013.01)

(58) Field of Classification Search
CPC .................. H04W 56/003–56/0045; H04W 74/08–74/0891; H04L 5/0091–5/0098
See application file for complete search history.

(56) References Cited

U.S. PATENT DOCUMENTS

| | | | |
|---|---|---|---|
| 2012/0008600 A1* | 1/2012 | Marinier | H04L 5/001 370/336 |
| 2012/0275390 A1* | 11/2012 | Korhonen | H04W 74/006 370/329 |
| 2012/0300714 A1* | 11/2012 | Ng | H04W 56/0045 370/329 |

(Continued)

OTHER PUBLICATIONS

Intel Corporation, "Enhancements on MAC procedures to support CA with multiple TA," 3GPP TSG RAN2#74 meeting, R2-113214 (May 9-13, 2011).

(Continued)

*Primary Examiner* — Marcus R Smith
(74) *Attorney, Agent, or Firm* — Volpe and Koenig, P.C.

(57) ABSTRACT

A method for uplink timing alignment in a wireless transmit/receive unit is provided. The method includes receiving control signaling from an evolved Node B, receiving on a primary cell (PCell) a physical downlink control channel (PDCCH) order, the PDCCH order including a carrier indicator field indicating a secondary cell (SCell) to transmit a physical random access channel (PRACH) transmission. In response to the PDCCH order, transmitting the PRACH transmission, and in response to the PRACH transmission, monitoring the PCELL for a random access response (RAR). In response to detecting an RAR associated with the PRACH transmission, adjusting timing for the SCell in response to a timing advance included in the RAR.

16 Claims, 12 Drawing Sheets

| POSSIBILITIES FOR #425 IN FIGURE 4 | |
|---|---|
| SCHEDULED UL TRANSMISSION ON THE CONCERNED SCell | 610 |
| SCHEDULED UL TRANSMISSION ON THE PCell | 615 |
| SCHEDULED UL TRANSMISSION ON ANY SERVING CELL | 620 |
| SCHEDULED UL TRANSMISSION ON ANY SERVING CELL IN THE SAME BAND AS THE CONCERNED SCell | 625 |
| ANY TYPE OF SCHEDULED UL TRANSMISSION | 630 |
| SPECIFIC TYPE OF UL TRANSMISSION SUCH AS ACK/NACK TRANSMISSION | 635 |
| SPECIFIC TYPE OF UL TRANSMISSION SUCH AS A PUCCH TRANSMISSION | 640 |
| SPECIFIC TYPE OF TRANSMISSION SUCH AS PERIODIC SRS TRANSMISSION | 645 |
| SPECIFIC TYPE OF TRANSMISSION SUCH AS APERIODIC SRS TRANSMISSION | 650 |
| SPECIFIC TYPE OF TRANSMISSION SUCH AS PERIODIC CSI TRANSMISSION | 655 |
| SPECIFIC TYPE OF UL TRANSMISSION SUCH AS PRACH SCHEDULED FOR TRANSMISSION ON ANOTHER SERVING CELL | 660 |

(56) References Cited

U.S. PATENT DOCUMENTS

2012/0327910 A1* 12/2012 Dalsgaard ............ H04L 5/0098
370/335

OTHER PUBLICATIONS

Interdigital Communications, "Support for multiple Timing Advance in LTE CA," 3GPP TSG-RAN WG2 #74, R2-113255 (May 9-13, 2011).
Interdigital Communications, "Support for RACH on SCells in LTE CA," 3GPP TSG-RAN WG2 #74, R2-113258 (May 9-13, 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.3.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.1.0 (Mar. 2011).
Intel Corporation, "Enhancements on MAC procedures to support CA with multiple TA," 3GPP TSG-RAN2#73-bis meeting, R2-112137, Shanghai, China, (Apr. 11-15, 2011).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.6.0 (Mar. 2012).
Third Generation Partnership Project, "Technical Specification Group Radio Access Network; Evolved Universal Terrestrial Radio Access (E-UTRA); User Equipment (UE) radio transmission and reception (Release 11)," 3GPP TS 36.101 V11.0.0 (Mar. 2012).

(56) References Cited

OTHER PUBLICATIONS

Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.2.1 (Apr. 2011).

* cited by examiner

| POSSIBLE COLLISIONS FOR #410 IN FIGURE 4 |
| --- |
| PREAMBLE (RE)TRANSMISSION COINCIDES WITH A SCHEDULED UL TRANSMISSION ON THE CONCERNED SCell — 510 |
| PREAMBLE (RE)TRANSMISSION COINCIDES WITH A SCHEDULED UL TRANSMISSION ON THE PCell — 515 |
| PREAMBLE (RE)TRANSMISSION COINCIDES WITH A SCHEDULED UL TRANSMISSION ON ANY SERVING CELL — 520 |
| PREAMBLE (RE)TRANSMISSION COINCIDES WITH A SCHEDULED UL TRANSMISSION ON ANY SERVING CELL IN THE SAME BAND AS THE CONCERNED SCell — 525 |
| PREAMBLE (RE)TRANSMISSION COINCIDES WITH ANY TYPE OF SCHEDULED UL TRANSMISSION — 530 |
| PREAMBLE (RE)TRANSMISSION COINCIDES WITH A SPECIFIC TYPE OF UL TRANSMISSION SUCH AS ACK/NACK TRANSMISSION — 535 |
| PREAMBLE (RE)TRANSMISSION COINCIDES WITH A SPECIFIC TYPE OF UL TRANSMISSION SUCH AS A PUCCH TRANSMISSION — 540 |
| PREAMBLE (RE)TRANSMISSION COINCIDES WITH A SPECIFIC TYPE OF TRANSMISSION SUCH AS PERIODIC SRS TRANSMISSION — 545 |
| PREAMBLE (RE)TRANSMISSION COINCIDES WITH A SPECIFIC TYPE OF TRANSMISSION SUCH AS APERIODIC SRS TRANSMISSION — 550 |
| PREAMBLE (RE)TRANSMISSION COINCIDES WITH A SPECIFIC TYPE OF UL TRANSMISSION SUCH AS PERIODIC CSI TRANSMISSION — 555 |
| PREAMBLE (RE)TRANSMISSION COINCIDES WITH A SPECIFIC TYPE OF UL TRANSMISSION SUCH AS PRACH SCHEDULED FOR TRANSMISSION ON ANOTHER SERVING CELL — 560 |

FIG. 5

| POSSIBILITIES FOR #425 IN FIGURE 4 |
|---|
| SCHEDULED UL TRANSMISSION ON THE CONCERNED SCell — 610 |
| SCHEDULED UL TRANSMISSION ON THE PCell — 615 |
| SCHEDULED UL TRANSMISSION ON ANY SERVING CELL — 620 |
| SCHEDULED UL TRANSMISSION ON ANY SERVING CELL IN THE SAME BAND AS THE CONCERNED SCell — 625 |
| ANY TYPE OF SCHEDULED UL TRANSMISSION — 630 |
| SPECIFIC TYPE OF UL TRANSMISSION SUCH AS ACK/NACK TRANSMISSION — 635 |
| SPECIFIC TYPE OF UL TRANSMISSION SUCH AS A PUCCH TRANSMISSION — 640 |
| SPECIFIC TYPE OF TRANSMISSION SUCH AS PERIODIC SRS TRANSMISSION — 645 |
| SPECIFIC TYPE OF TRANSMISSION SUCH AS APERIODIC SRS TRANSMISSION — 650 |
| SPECIFIC TYPE OF TRANSMISSION SUCH AS PERIODIC CSI TRANSMISSION — 655 |
| SPECIFIC TYPE OF UL TRANSMISSION SUCH AS PRACH SCHEDULED FOR TRANSMISSION ON ANOTHER SERVING CELL — 660 |

METHOD AND APPARATUS FOR OBTAINING UPLINK TIMING ALIGNMENT ON A SECONDARY CELL

CROSS REFERENCE TO RELATED APPLICATIONS

This application is a continuation of U.S. Non-provisional application Ser. No. 13/468,709 filed May 10, 2012 which claims the benefit of U.S. Provisional Application No. 61/484,591 filed May 10, 2011, the contents of which is hereby incorporated by reference herein.

BACKGROUND

Third Generation Partnership Project (3GPP) Long Term Evolution (LTE) Release 8+ operating with a single serving cell (hereafter LTE R8+) supports up to 100 Mbps in the downlink (DL), and 50 Mbps in the uplink (UL) for a 2×2 configuration. The LTE downlink transmission scheme is based on an orthogonal frequency division multiple access (OFDMA) air interface. For the purpose of flexible deployment, LTE R8+ systems support scalable transmission bandwidths, one of 1.4, 2.5, 5, 10, 15, or 20 MHz.

In LTE R8+, each radio frame (10 ms) includes 10 equally sized sub-frames of 1 ms. Each sub-frame includes 2 equally sized timeslots of 0.5 ms each. There can be either seven or six orthogonal frequency division multiplexing (OFDM) symbols per timeslot. Seven symbols per timeslot are used with normal cyclic prefix length, and six symbols per timeslot can be used in an alternative system configuration with the extended cyclic prefix length. The sub-carrier spacing for the LTE R8/9 system is 15 kHz. An alternative reduced sub-carrier spacing mode using 7.5 kHz is also possible.

A resource element (RE) corresponds to one (1) sub-carrier during one (1) OFDM symbol interval. Twelve (12) consecutive sub-carriers during a 0.5 ms timeslot constitute one (1) resource block (RB). With seven (7) symbols per timeslot, each RB includes 12×7=84 REs. A DL carrier may consist of scalable number of resource blocks (RBs), ranging from a minimum of six (6) RBs up to a maximum of 110 RBs. This corresponds to an overall scalable transmission bandwidth of roughly 1 MHz up to 20 MHz. However, usually a set of common transmission bandwidths is specified, for example, 1.4, 3, 5, 10 or 20 MHz.

The basic time-domain unit for dynamic scheduling is one sub-frame including two consecutive timeslots. This is sometimes referred to as a resource-block pair. Certain sub-carriers on some OFDM symbols are allocated to carry pilot signals in the time-frequency grid. A given number of sub-carriers at the edges of the transmission bandwidth are not transmitted in order to comply with spectral mask requirements.

SUMMARY

A method for uplink timing alignment in a wireless transmit/receive unit is provided. The method includes receiving control signaling from an evolved Node B, receiving on a primary cell (PCell) a physical downlink control channel (PDCCH) order, the PDCCH order including a carrier indicator field indicating a secondary cell (S Cell) to transmit a physical random access channel (PRACH) transmission. In response to the PDCCH order, transmitting the PRACH transmission, and in response to the PRACH transmission, monitoring the PCELL for a random access response (RAR). In response to detecting an RAR associated with the PRACH transmission, adjusting timing for the SCell in response to a timing advance included in the RAR.

BRIEF DESCRIPTION OF THE DRAWINGS

A more detailed understanding may be had from the following description, given by way of example in conjunction with the accompanying drawings wherein:

FIG. 5 shows Examples of the conditions for which the WTRU may postpone SCell preamble re(transmissions) to a subsequent occasion;

FIG. 6 shows scenarios in which a WTRU may avoid selecting a PRACH that would collide with another transmission;

DETAILED DESCRIPTION

Figure 1A:
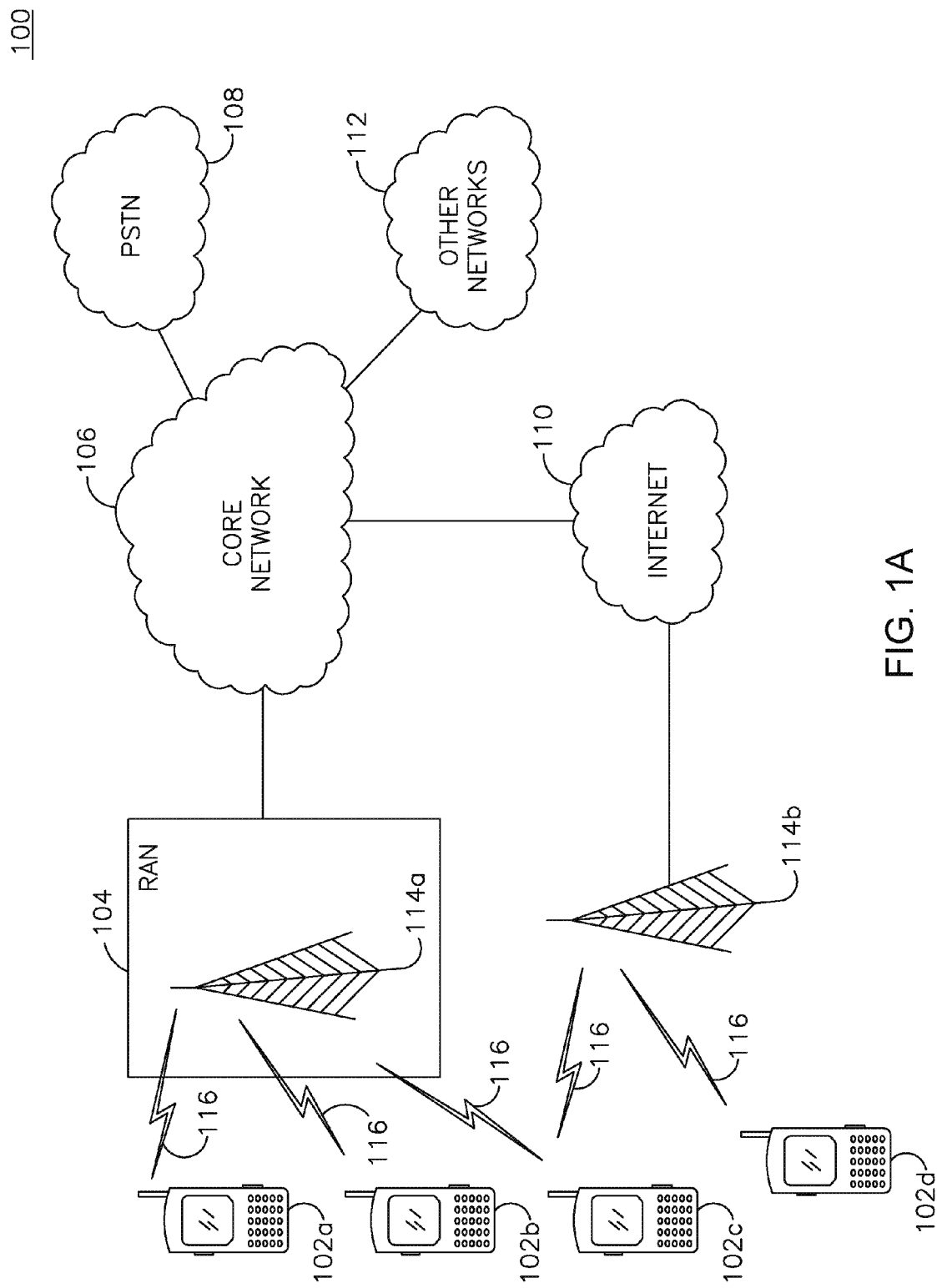
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
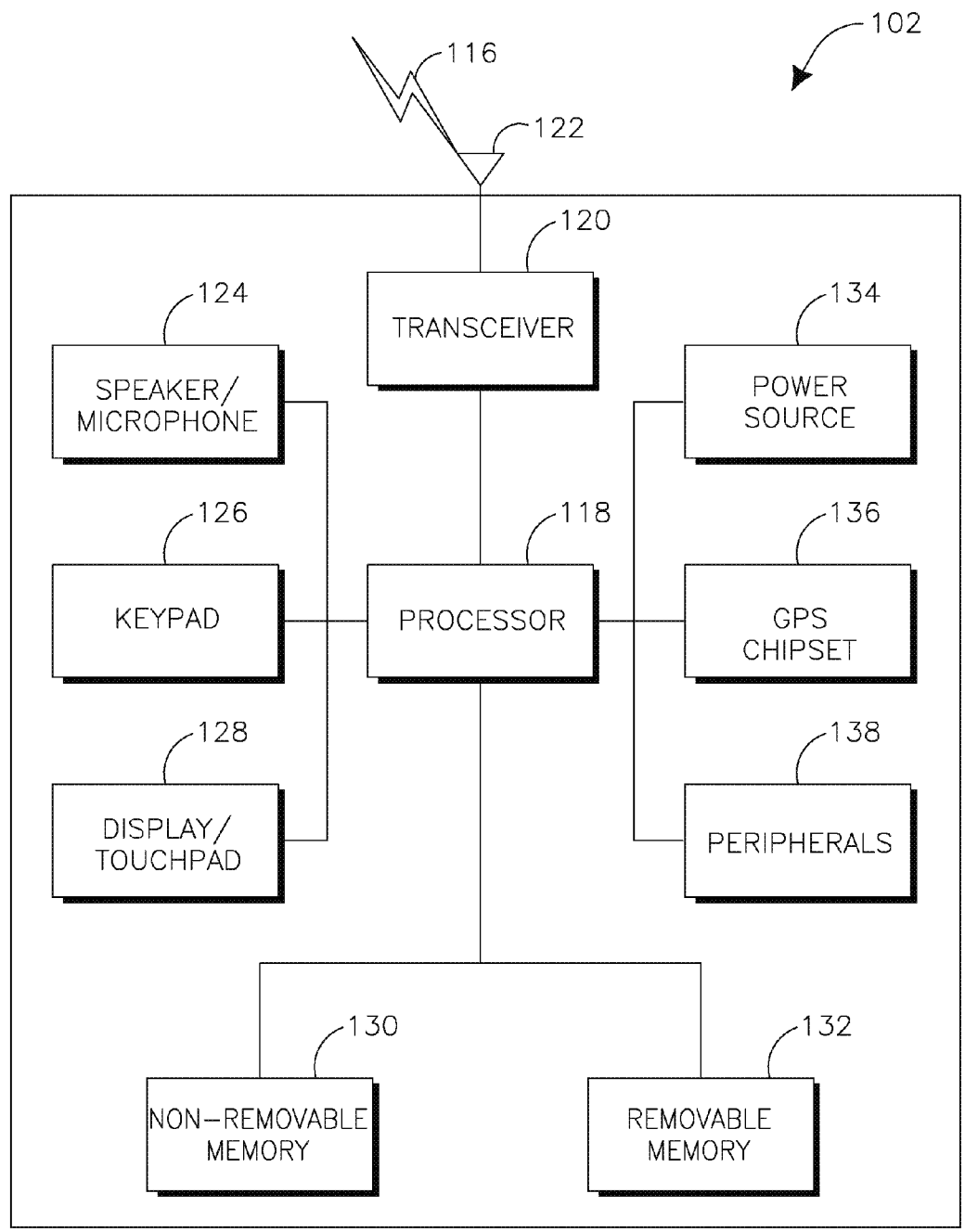
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
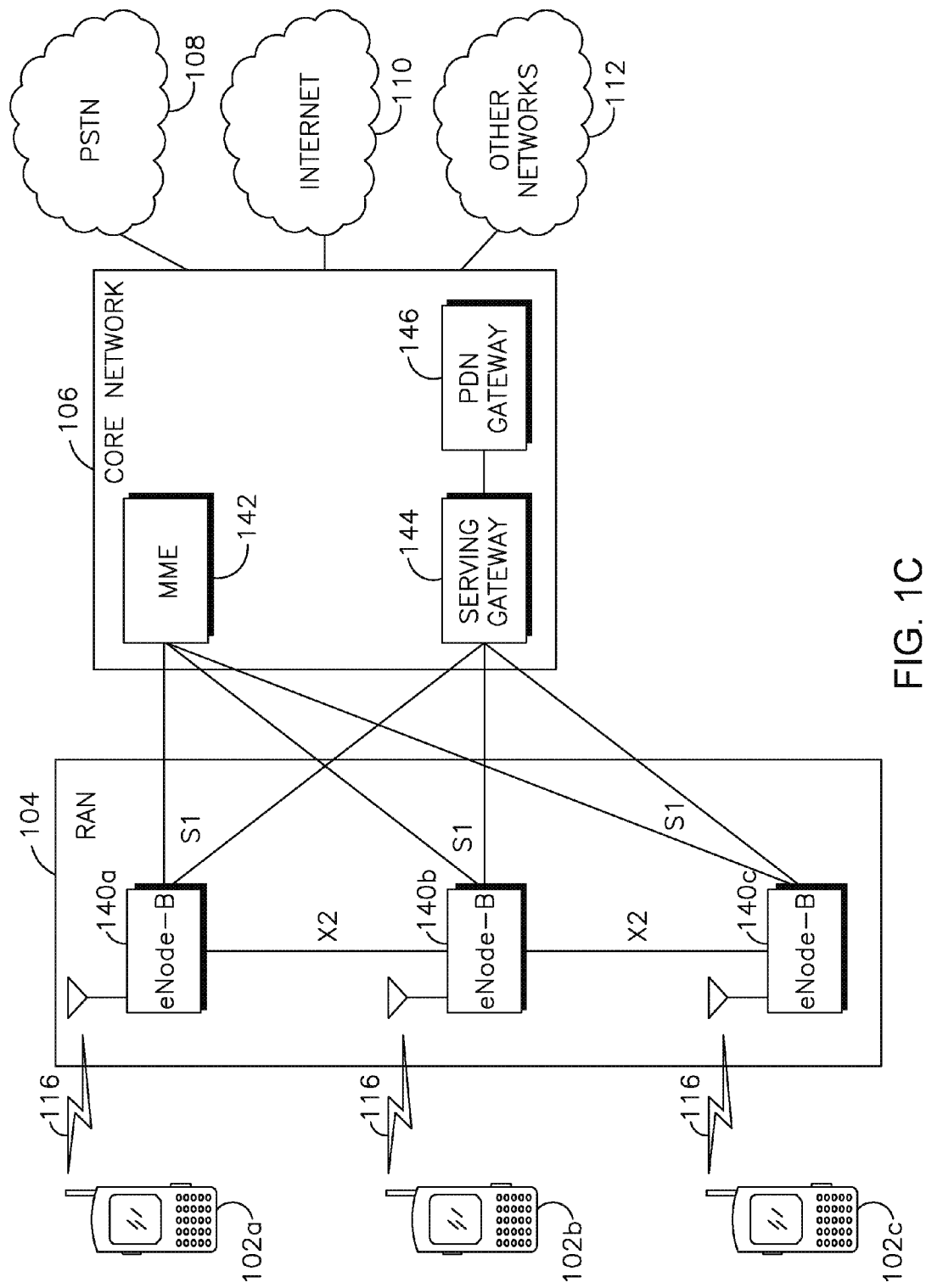
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In a LTE R8+ system, the network may control physical radio resources using the Physical Downlink Control Channel (PDCCH). Control messages are transmitted using specific formats, for example, downlink control information (DCI) formats. A wireless transmit/receive unit (WTRU) determines whether it may act on control signaling in a given sub-frame by monitoring the PDCCH for specific data control information messages (DCI formats). The PDCCH for specific DCI formats may be scrambled using a known radio network temporary identifier (RNTI) in specific locations, or search space, using different combinations of physical resources, for example, control channel elements (CCEs), based on aggregation levels (AL). Each AL may correspond to either 1, 2, 4, or 8 CCEs. A CCE includes 36 quadrature phase shift keying (QPSK) symbols, or 72 channel coded bits.

The PDCCH is conceptually separated in two distinct regions. The set of CCE locations in which a WTRU may find DCIs it should act on is referred to as a search space (SS). The SS is split into the common SS (CSS) and WTRU-specific SS (WTRUSS). The CSS is common to all WTRUs monitoring a given PDCCH, while the WTRUSS differs from one WTRU to another. Both SSs may overlap for a given WTRU in a given sub-frame as this is a function of the randomization function, and this overlap differs from one sub-frame to another.

The set of CCE locations that makes up the CSS and its starting point is a function of the cell identity and the sub-frame number. For LTE R8/9, DCIs may only be sent with AL4 (4 CCEs) or AL8 (8 CCEs) in the CSS. For a sub-frame for which the WTRU monitors the PDCCH, the WTRU may attempt to decode 2 DCI format sizes in up to 4 different sets of 4 CCES for AL4 (or 8 blind decoding) and up to 2 different sets of 8 CCEs for AL8 (or 4 blind decoding) for a total of at most 12 blind decoding attempts in the CSS. For example, the 2 DCI format sizes may be formats 1A, 1C, and 3A used for power control.

The CSS corresponds to CCEs 0-15, implying four decoding candidates for AL4 (i.e., CCEs 0-3, 4-7, 8-11, 12-15) and two decoding candidates for AL8, for example, CCEs 0-7, 8-15.

The set of CCE locations that makes up the WTRUSS and its starting point is a function of the WTRU identity and the sub-frame number. For LTE R8+, DCI may be sent with AL1, AL2, AL4 or AL8 in the WTRUSS. For a sub-frame for which the WTRU monitors the PDCCH, the WTRU may attempt to decode 2 DCI formats in up to 6 different CCES for AL1 (i.e., 12 blind decoding), up to 6 different sets of 2 CCEs for AL2 (i.e., 12 blind decoding), up to 2 different sets of 4 CCEs for AL4, for example, 4 blind decoding, and up to 2 different sets of 8 CCEs for AL8, for example, 4 blind decoding, for a total of at most 32 blind decoding attempts in the WTRUSS.

The DCI formats which the WTRU decodes depends on the configured transmission mode, for example, whether or not spatial multiplexing is used. There are a number of different DCI formats; for example, format 0 (UL grant), format 1 (non-MIMO), format 2 (DL MIMO) and format 3 (power control). The version of each DCI format(s) the WTRU decodes is governed at least in part by the configured transmission mode, for example, modes 1-7.

A summary list with typical usage is presented below:
DCI format 0 (UL grant)
DCI format 1 (DL assignment)
DCI format 1A (compact DL assignment/PDCCH order for random access)
DCI format 1B (DL assignment with precoding info)
DCI format 1C (very compact DL assignment)
DCI format 1D (compact DL assignment with precoding info+power offset info)
DCI format 2 (DL assignment for spatial multiplexing)
DCI format 2A
DCI format 3 (TPC for PUCCH/PDSCH, two bits)
DCI format 3A (TPC for PUCCH/PDSCH, single bit)

A table illustrating the different DCI sizes resulting from different system bandwidth configurations is provided in Table 1.

TABLE 1

| Bandwidth | 6 | 15 | 25 | 50 | 75 | 100 |
|---|---|---|---|---|---|---|
| Format 0 | 37 | 38 | 41 | 43 | 43 | 44 |
| Format 1A | 37 | 38 | 41 | 43 | 43 | 44 |
| Format 3/3A | 37 | 38 | 41 | 43 | 43 | 44 |
| Format 1C | 24 | 26 | 28 | 29 | 30 | 31 |
| Format 1 | 35 | 39 | 43 | 47 | 49 | 55 |
| Format 1B (2 tx ant) | 38 | 41 | 43 | 44 | 45 | 46 |
| Format 1D (2 tx ant) | 38 | 41 | 43 | 44 | 45 | 46 |
| Format 2 (2 tx ant) | 47 | 50 | 55 | 59 | 61 | 67 |
| Format 2A (2 tx ant) | 44 | 47 | 52 | 57 | 58 | 64 |
| Format 1B (4 tx ant) | 41 | 43 | 44 | 46 | 47 | 49 |

TABLE 1-continued

| Format 1D (4 tx ant) | 41 | 43 | 44 | 46 | 47 | 49 |
|---|---|---|---|---|---|---|
| Format 2 (4 tx ant) | 50 | 53 | 58 | 62 | 64 | 70 |
| Format 2A (4 tx ant) | 46 | 49 | 54 | 58 | 61 | 66 |

In LTE R8+ systems, whether the control signaling received on a PDCCH pertains to the uplink component carrier or to the downlink component carrier is related to the format of the DCI decoded by the WTRU, and the DCI formats are used to control the WTRUs communication on the uplink component carrier and on the DL component carrier of the cell on to which the WTRU is connected.

A WTRU may request radio resources for an uplink transmission by sending a scheduling request (SR) to the eNB. The SR may be transmitted either on dedicated resources (D-SR) on the Physical Uplink Control Channel (PUCCH) if configured, or using the Random Access procedure (RA-SR).

For an LTE serving cell, a WTRU may determine uplink radio link failure when it reaches the maximum number of preamble transmissions for the random access procedure and/or repeated failure to perform the random access procedure on the concerned serving cell.

For an LTE serving cell, a WTRU may determine DL radio link failure when the radio resource control (RRC) instance receives a predetermined number (N310) of consecutive "out-of-synch" indications from the physical layer and a timer T310 subsequently expires while the WTRU has not recovered from the error condition that started the timer.

LTE-Advanced operating with multiple serving cells (LTE R10+) is an evolution that aims to improve LTE R8+ data rates using, among other methods, bandwidth extensions, also referred to as carrier aggregation (CA). With CA, a WTRU may transmit and receive simultaneously over the physical uplink shared channel (PUSCH) and the physical downlink shared channel (PDSCH), respectively, of multiple serving cells. Up to five serving cells (possibly with or without configured uplink resources) may be used thus supporting flexible bandwidth assignments up to 100 MHz. In addition to the baseline functionality of LTE R8+, a number of additional methods have been introduced to support the simultaneous operation of a WTRU on multiple serving cells.

The control information for the scheduling of PDSCH and PUSCH may be sent on one or more PDCCH(s). In addition to the LTE R8+ scheduling using one PDCCH for a pair of UL and DL carriers, cross-carrier scheduling may also be supported on the PDCCH of a serving cell, for example, the primary cell (PCell), allowing the network to provide PDSCH assignments and/or PUSCH grants for any other serving cell, for example, a secondary cell (S Cell). When cross-carrier scheduling is used, a 3-bit carrier indicator field (CIF) may be used to address the concerned S Cell, where each S Cells identifier is derived from RRC configuration.

When referred to hereafter, the term "component carrier (CC)" includes, without loss of generality, a frequency on which the WTRU operates. For example, a WTRU may receive transmissions on a downlink CC (DL CC). A DL CC may comprise a plurality of DL physical channels. A WTRU may perform transmissions on an uplink CC (UL CC). A UL CC may comprise a plurality of UL physical channels.

For example, for LTE the downlink physical channels may include, while not being limited to, a Physical Control Format Indicator Channel (PCFICH), a Physical Hybrid ARQ Indicator Channel (PHICH), a Physical Downlink Control Channel (PDCCH), a Physical Multicast data Channel (PMCH) and a Physical Downlink Shared Channel (PDSCH). On the PCFICH, the WTRU may receive control data indicating the size of the control region of the DL CC. On the PHICH, the WTRU may receive control data indicating hybrid automatic repeat request (HARQ) positive acknowledgement/negative acknowledgement feedback (HARQ A/N, HARQ ACK/NACK or HARQ-ACK) for a previous uplink transmission. On the PDCCH, the WTRU may receive downlink control information (DCI) messages, mainly used for the purpose of scheduling of downlink and uplink resources. On the PDSCH, the WTRU may receive user and/or control data. For example, a WTRU may transmit on an uplink CC (UL CC).

For example, for LTE the uplink physical channels may include, while not being limited to, a Physical Uplink Control Channel (PUCCH) and a Physical Uplink Shared Channel (PUSCH). On the PUSCH, the WTRU may transmit user and/or control data. On the PUCCH, and in some case on the PUSCH, the WTRU may transmit uplink control information (UCI). UCI may include a channel quality indicator (CQI), precoding matrix indicator (PMI), rank indicator (RI), or scheduling request (SR), or HARQ ACK/NACK feedback. On a UL CC, the WTRU may also be allocated dedicated resources for transmission of sounding reference signals (SRS).

A cell may comprise a DL CC which may be linked to a UL CC based on the system information (SI) received by the WTRU. The SI may be broadcasted on the DL CC or using dedicated configuration signaling from the network. For example, when broadcasted on the DL CC, the WTRU may receive the uplink frequency and bandwidth of the linked UL CC as part of a system information element. For example, the WTRU may receive the uplink frequency and bandwidth of the linked UL CC as part of the system information element when in RRC_IDLE for LTE, when in IDLE or CELL_FACH for WCDMA, or when the WTRU does not yet have a radio resource connection to the network.

When referred to hereafter, the term "PCell" includes, without loss of generality, the cell operating of the primary frequency in which the WTRU may perform the initial access to the system or the cell indicated as the primary cell in the handover procedure, or the like. For example, the initial connection access to the system may be the initial connection establishment procedure or the connection re-establishment procedure. PCell may correspond to a frequency indicated as part of the radio resource connection configuration procedure. Some functions may or may not be supported on the PCell. For example, the UL CC of the PCell may correspond to the CC whose physical uplink control channel resources are configured to carry all HARQ ACK/NACK feedback for a given WTRU.

For example, in LTE the WTRU may use the PCell to derive the parameters for the security functions and for upper layer system information such as non-access stratum (NAS) mobility information. Other functions that may be supported on the PCell DL include system information (SI) acquisition and change monitoring procedures on the broadcast channel (BCCH), and paging.

When referred to hereafter, the term "SCell" includes, without loss of generality, the cell operating on a secondary frequency which may be configured once a radio resource control connection is established and which may be used to provide additional radio resources. System information relevant for operation in the concerned SCell may be provided using dedicated signaling when the SCell is added to the WTRU's configuration. Although the parameters may have different values than those broadcasted on the downlink of the concerned SCell using the SI signaling, this information may be referred to as SI of the concerned S Cell independently of the method used by the WTRU to acquire this information.

When referred to hereafter, the terms "PCell DL" and "PCell UL" corresponds to, without loss of generality, the DL CC and the UL CC of the PCell, respectively. Similarly, the terms "S Cell DL" and "SCell UL" corresponds to the DL CC and the UL CC (if configured) of an SCell, respectively.

When referred to hereafter, the term "serving cell" includes, without loss of generality, a PCell or an SCell. More specifically, for a WTRU that is not configured with any SCell or that does not support operation on multiple CCs, for example, carrier aggregation, there may be one serving cell comprising of the PCell. For a WTRU that is configured with at least one SCell, the term "serving cell" includes one or more cells comprising the PCell and all configured SCell(s).

When a WTRU is configured with at least one SCell, there may be one PCell DL and one PCell UL and, for each configured SCell, there may be one S Cell DL and one SCell UL (if configured).

When referred to hereafter, the term "timing advance (TA) Group" (TAG) includes, without loss of generality, one or more serving cells for which a WTRU may apply the same timing advance offset. For example one or more serving cells may be configured with uplink resources. For example, the same timing advance offset may be using a downlink timing reference for each cell, which reference may or may not be the same cell for all cells of a group. The cells configured for a WTRU may be associated to either the primary TAG or to a secondary TAG. For example, a single time advance command (TAC), either received in a random access response (RAR) or in a MAC control element (CE), may apply to the TA corresponding to the uplink transmission of any serving cell in the same TAG.

For each cells with configured uplink within a TA group, the WTRU may apply the same TA offset. Assuming that an WTRU supports at most two TAs, the configured cells may be associated to either the primary TA group or to the secondary TA group. The PCell may be part of the primary TA group.

A primary TAG may include at least the PCell and zero or more SCells for which SCells, if configured with resources for uplink transmissions, may share the same uplink synchronization characteristics. For example, the SCells may use the PCell DL as the timing reference for uplink transmissions.

A secondary TAG may include one or more SCells for which SCells, if configured with resources for uplink transmissions, may share the same uplink synchronization characteristics. For example, a secondary TAG may use either the S Cell DL of one of the S Cells of the same TAG or their associate S Cell DL and may apply the same TA. Whether or not an SCell configured with uplink resources belongs to the primary TAG or to a secondary TAG, the SCell may be configured semi-statically, for example using RRC control signaling. For example, when an SCell is added or modified in the WTRU configuration.

Examples disclosed herein are related to how a mobile wireless terminal, for example, a WTRU, when configured for multicarrier operation, may gain uplink timing alignment on an S Cell of its multicarrier configuration.

For the random access procedure on the PCell in LTE R8+, the WTRU may monitor the PDCCH for random access RNTI (RA-RNTI) in the PDCCH CSS during the RAR window.

In LTE R11, the WTRU may support a random access procedure, or a similar method to obtain uplink timing alignment, in particular for gaining uplink timing advance. If a RACH procedure may be performed on SCells, a WTRU may monitor the PDCCH for decoding of RA-RNTI for reception of an RAR. For SCells, in R10 there may be no DCI that needs to be decoded in the CSS for SCells. Thus, SCells may not define a CSS on the PDCCH of their corresponding SCell DL for R10 WTRUs. Introducing an RACH on SCells may require that the WTRU monitors the RA-RNTI for SCells for the RAR. SCells in LTE R10 define a WTRU search space (WTRUSS) on the PDCCH, and no CSS. Thus, it may not be possible to receive a DCI scrambled with an RA-RNTI on the PDCCH of an SCell.

Examples where a WTRU may monitor the CSS of an SCell, for the RACH procedure, are disclosed. In particular, if the WTRU uses a contention-based preamble, such method may be necessary because an eNB may not know the identity of the WTRU. For example, the WTRU may use a contention-based preamble in the case of contention-based random access (CBRA).

Alternative examples are disclosed in cases where a dedicated preamble is used on SCells, for example, in the case of contention free random access (CFRA). In those examples, uplink timing synchronization may be obtained without the need for the WTRU to monitor the CSS of an SCell, in particular, if the preamble transmission is initiated in a manner that is known and/or controlled by the eNB. For example, by reception of a PDCCH DCI that orders the WTRU to perform at least a preamble transmission on the uplink of an SCell.

Examples of the WTRU obtaining uplink timing alignment for one or more SCells are disclosed. For example, the SCells may be configured uplink resources. This may include, more generally, how a WTRU may perform a RACH procedure, or a variant of the R10 RACH procedure, or at least a preamble transmission on an SCell and a proper determination that the procedure is completed for the preamble transmission.

For example, the WTRU may perform a procedure that includes at least one of the following steps to gain uplink timing synchronization: initiation of the procedure, preamble transmission, preamble retransmissions, if supported, and completion of the procedure. Details of each step to gain uplink timing synchronization are described below.

A WTRU may initiate a procedure involving the transmission of a preamble, such as RACH procedure, a variant thereof, or a procedure to gain uplink timing alignment, either autonomously or in response to reception of control signaling.

If initiated autonomously, the WTRU may use a dedicated preamble and a physical random access channel (PRACH) mask index from an RRC configuration in case of a CFRA or a variant thereof. The WTRU may also use a medium access control (MAC) entity to select a preamble using the conventional LTE R8+ preamble selection methods in case of a CBRA or a variant thereof is used.

In a network-controlled preamble transmission, the WTRU may initiate the procedure upon receipt of control signaling from an eNB. The WTRU may receive the control signaling from the eNB on the PDCCH of the concerned SCell or cross-carrier scheduled. For example, the concerned S Cell may be an S Cell with configured uplink resources and configured PRACH resources. For example, the cross-carrier scheduled may be on the PDCCH of another serving cell, for example, PCell.

Figure 2:
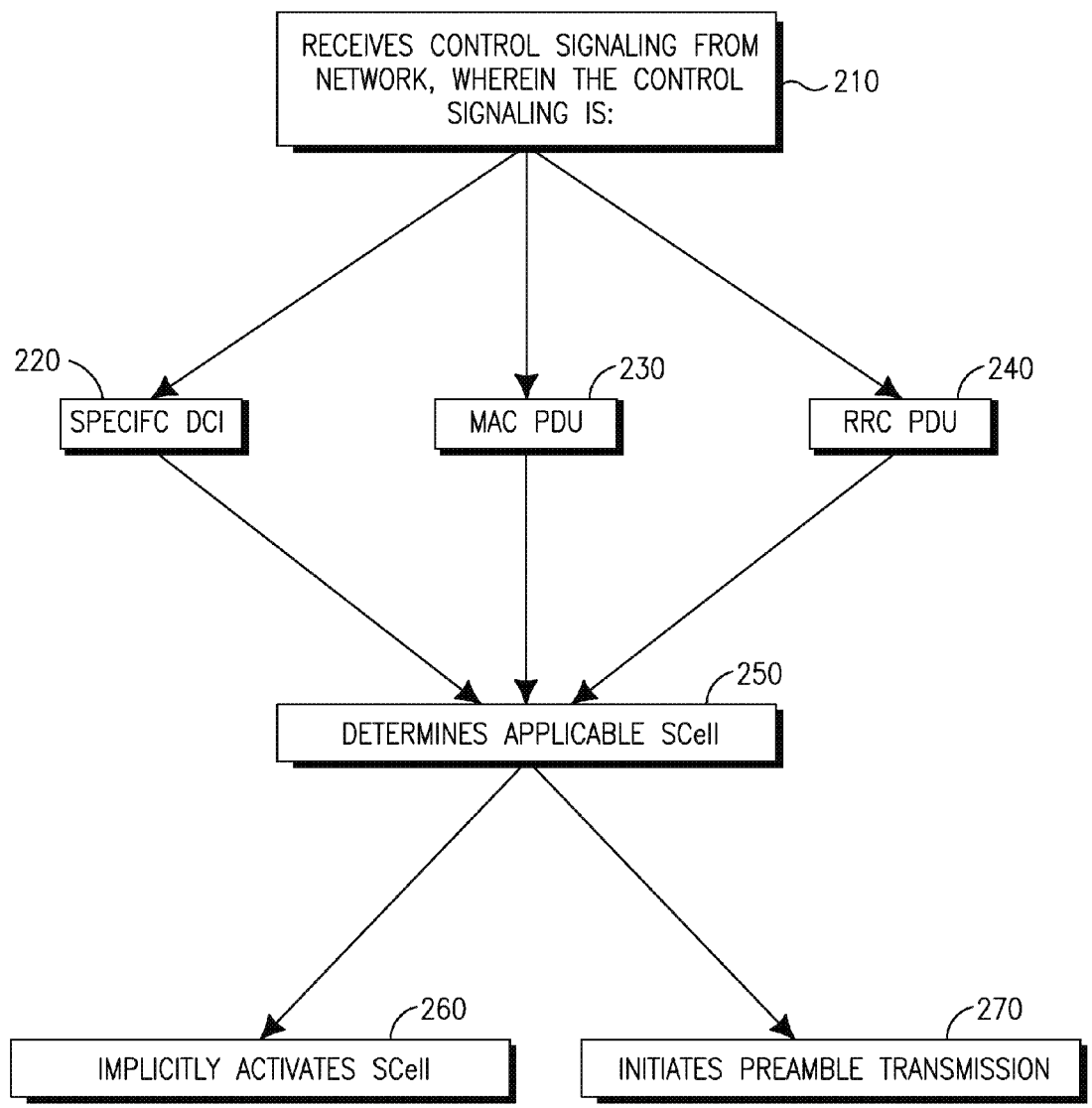
FIG. 2 is an example flow diagram of a network-controlled preamble transmission.

FIG. 2 is an example flow diagram of a network-controlled preamble transmission. The WTRU may first receive control signaling from the network at 210. The control signaling may be a specific DCI 220, a medium access control (MAC) protocol data unit (PDU) 230, or an RRC PDU 240. The WTRU may then determine the applicable SCell at 250. Once the applicable SCell is determined, the WTRU may implicitly activate the SCell at 260 or initiate a preamble transmission at 270.

The WTRU may initiate a preamble transmission according to at least one of the following methods:

The WTRU may receive a specific DCI, for example, a PDCCH order to perform a preamble transmission, by decoding a DCI format 1A, by decoding a DCI format scrambled with the WTRU's Cell-RNTI (C-RNTI), or by decoding a DCI format scrambled with an SCell- (or TAG-) specific RNTI, which indicates on which SCell (or which TAG) the procedure may be performed. The DCI may include a dedicated preamble, a PRACH mask index applicable to the concerned S Cell.

The DCI may indicate that the preamble transmission is for obtaining uplink timing synchronization.

The DCI may include a carrier indication field (CIF) which may be used to determine the identity of the S Cell on which uplink resources the preamble is transmitted.

The DCI may include an indication of whether the preamble transmission is an initial transmission, a retransmission, or alternatively to what retransmission in a sequence of preamble transmission the retransmission should correspond. For example, an initial transmission may be codepoint 0, a retransmission may be codepoint 1, and a sequence of preamble transmission the retransmission corresponds to may be codepoint 01, 10, 11 in the case of, at most, three retransmissions. For example, the received codepoint may correspond to PREAMBLE_TRANSMISSION_COUNTER+1.

The DCI may include an indication of power settings, for example, according to a sequence of transmissions as disclosed above, or an indication to increase by some power step the preamble transmit power from either a previous preamble transmission attempt or from a pre-defined value.

The DCI may include a CIF field, in case of cross-carrier scheduling, which may indicate a serving cell with configured uplink resources for which the request for a preamble transmission applies. Alternatively, the DCI may include a CIF field which may indicate a serving cell as part of a secondary TAG for which the request for a preamble transmission applies, for example, for gaining uplink timing alignment may be applied.

The DCI may indicate a maximum number of autonomous preamble retransmissions for the procedure, if autonomous preamble retransmissions are allowed. For example, an allowed autonomous retransmission may be an autonomous retransmission following the end of a window during which the WTRU has not met the conditions for the completion of the procedure or at expiration of a retransmission timer.

The DCI may indicate whether or not the preamble may be considered as an initial preamble transmission or as a preamble retransmission.

The WTRU may receive a MAC PDU including control signaling that triggers the initiation of the procedure. The MAC PDU may include a MAC activation/deactivation CE that activates an SCell for which the corresponding TA timer is stopped or expired. The MAC PDU may include a MAC control element (CE) that triggers the transmission of a preamble, for example, for gaining uplink timing for an SCell with configured uplink resources. The MAC CE may include a dedicated preamble and a PRACH mask index applicable to the concerned SCell. The MAC CE may include an indication for the WTRU to determine the identity of the SCell on which uplink resources the preamble may be transmitted. For example, the indication may be either a flag in a bitmap, a cell index field or based on the activation state of the S Cells.

The MAC PDU may indicate that the preamble transmission may be for obtaining uplink timing synchronization. The MAC CE may include an indication of whether the preamble transmission is an initial transmission, a retransmission, or alternatively to what retransmission in a sequence of preamble transmissions the retransmission should corresponds. For example, an initial transmission may be codepoint 0, a retransmission may be codepoint 1, and a sequence of preamble transmission the retransmission corresponds to may be codepoint 01, 10, 11 in the case of at most three retransmissions. For example, the received codepoint may correspond to PREAMBLE_TRANSMISSION_COUNTER+1. The MAC CE may include an indication of power settings, for example, according to a sequence of transmissions as disclosed above, or an indication to increase by some power step the preamble transmit power from either a previous preamble transmission attempt or from a pre-defined value. The MAC CE may indicate a maximum number of autonomous preamble retransmissions for the procedure, if autonomous preamble retransmissions are allowed. For example, an allowed autonomous retransmission may be an autonomous retransmission following the end of a window during which the WTRU has not met the conditions for the completion of the procedure, or at expiration of a retransmission timer. The MAC CE may indicate whether or not the preamble may be considered as an initial preamble transmission or as a preamble retransmission.

The WTRU may receive an RRC PDU including control signaling that triggers the initiation of the procedure, for example, upon addition of the SCell to the WTRU configuration. The RRC PDU may include a dedicated preamble and a PRACH mask index applicable to the concerned SCell. The RRC PDU may indicate that the preamble transmission may be for obtaining uplink timing synchronization. The RRC PDU may include an indication of whether the preamble transmission is an initial transmission, a retransmission, alternatively to what retransmission in a sequence of preamble transmissions the retransmission corresponds. For example, an initial transmission may be codepoint 0, a retransmission may be codepoint 1, and a sequence of preamble transmission the retransmission corresponds to may be codepoint 01, 10, 11 in the case of at most three retransmissions. For example, the received codepoint may correspond to PREAMBLE_TRANSMISSION_COUNTER+1. The RRC PDU may include an indication of power settings, for example, according to a sequence of transmissions as disclosed above, or an indication to increase by some power step the preamble transmit power from either a previous preamble transmission attempt or from a pre-defined value. The RRC PDU may indicate a maximum number of autonomous preamble retransmissions for the procedure, if autonomous preamble retransmissions are allowed. For example, an allowed autonomous retransmission may be an autonomous retransmission following the end of a window during which the WTRU has not met the conditions for the completion of the procedure, or at expiration of a retransmission timer. Alternatively, the preamble transmission may be triggered if the SCell is not considered synchronized. For example, the SCell may not be synchronized if the TAT corresponding to the S Cell is either stopped or expired.

The control signaling described above may be received on the PDCCH of the concerned S Cell. For example, the concerned S Cell may be either the S Cell on which uplink resource the WTRU may transmit a preamble or another S Cell of the same TA group which may trigger a preamble on another SCell (with configured PRACH resources) of the corresponding TAG.

Alternatively, the WTRU may receive any of the above control signaling by cross-carrier scheduling on any downlink serving cell of the WTRU. The reception of any of the above control signaling may implicitly activate the SCell (with configured PRACH resources) on which uplink resources the preamble may be transmitted, or all other SCells of the same TAG for which at least one SCell has a valid PRACH configuration.

Any of the above control signaling schemes may trigger the procedure for a plurality of SCells (with configured uplink and PRACH resources), or alternatively for at least one such SCell for each TAG (possibly for one or more secondary TAG).

In one example, the WTRU may decode a PDCCH scrambled with the C-RNTI of the WTRU. The WTRU may then determine that it received a DCI indicating that a procedure to gain uplink timing alignment may be performed. For example, the DCI indicator may be performed may be either a RACH procedure or a preamble transmission. The PDCCH may be either on an activated SCell, if configured to receive and decode PDCCH on the SCell, or on a PCell if configured for cross-carrier scheduling and if the concerned S Cell is activated. For example, in the case of CFRA, a DCI format 1A may be used including a dedicated preamble and a PRACH mask index. The DCI may include an indication that the preamble transmission is an initial preamble transmission for the procedure or a retransmission.

In R8+, the following is used to determine the transmission power for the preamble on the PCell where at least preambleInitialReceivedTargetPower and powerRampingStep may be provided by higher layer signaling.

A preamble transmission power PPRACH may be determined as: PPRACH=min{Pcmax,c(i), PREAMBLE_RECEIVED_TARGET_POWER+PLc}_[dBm], where Pcmax,c(i) is the configured WTRU transmit power for subframe i of the primary cell and PLc is the downlink pathloss estimate calculated in the WTRU for the primary cell.

The random-access procedure may be performed as follows: set PREAMBLE_RECEIVED_TARGET_POWER to preambleInitialReceivedTargetPower+DELTA_PREAMBLE+(PREAMBLE_TRANSMISSION_COUNTER−1)*powerRampingStep. The physical layer may then be instructed to transmit a preamble using the selected PRACH, corresponding RA-RNTI, preamble index and PREAMBLE_RECEIVED_TARGET_POWER.

Figure 3:
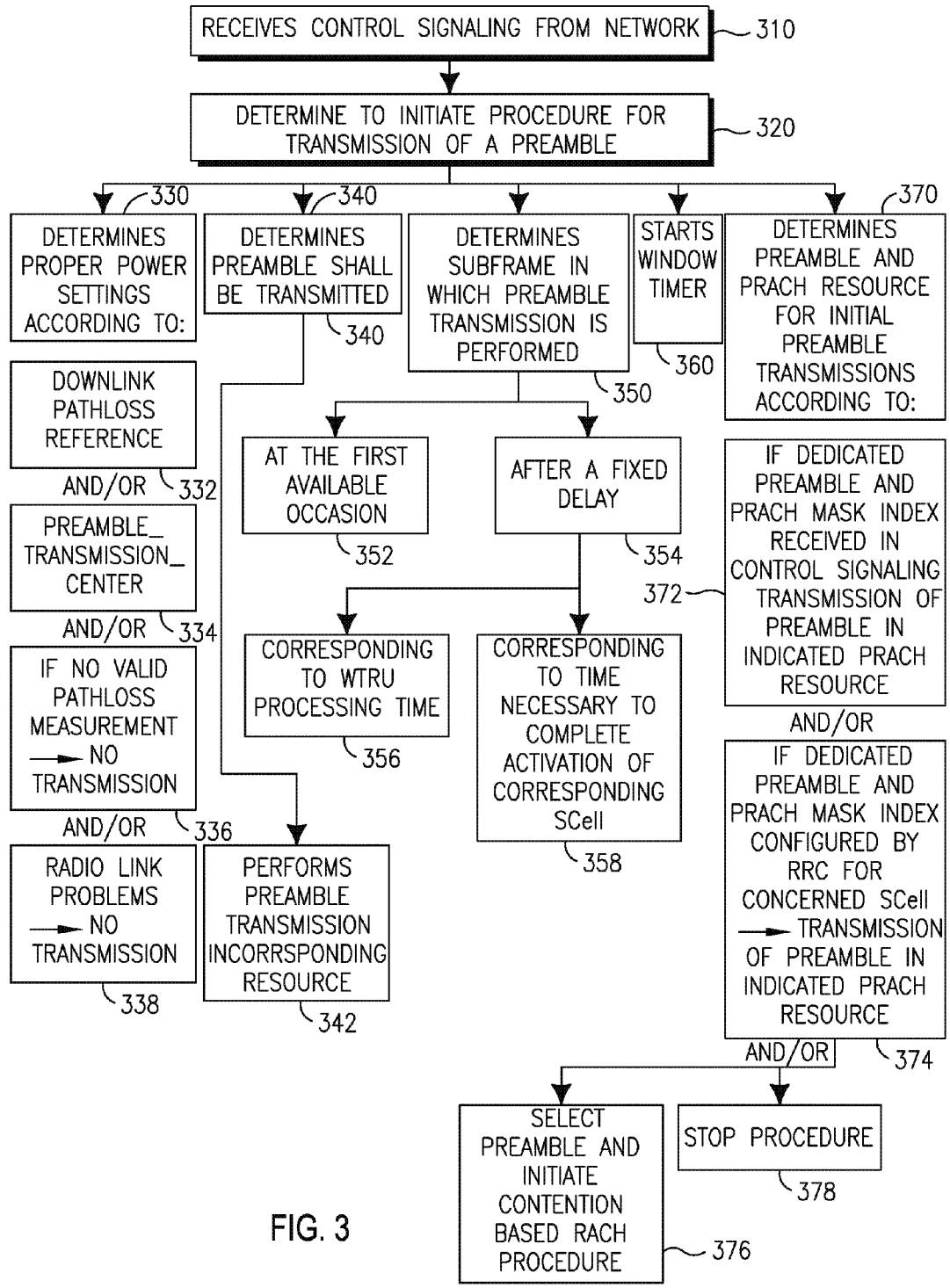
FIG. 3 shows example methods for preamble transmissions.

FIG. 3 shows example methods for preamble transmissions. The necessary parameters may be configured by higher layers for S Cells as part of the RACH configuration of the SCell. If after receiving control signaling from the network at 310, the WTRU determines, for example, using any example disclosed above, that it needs to initiate a procedure for the transmission of a preamble at 320, the WTRU may perform at least one of the following.

The WTRU may determine the proper power settings according to an initial preamble transmission at 330 based on at least one of the following: downlink pathloss reference 332; PREAMBLE_TRANSMSSION_COUNTER−1 334; no valid pathloss measurement 336; and radio link quality 338. The power setting may be set according to the downlink pathloss reference at 332. The downlink pathloss reference may be either the corresponding S Cell DL of the SCell UL used for the transmission of the preamble, any SCell DL of the TAG of the SCell for which the SCell UL is used for the transmission of the preamble, or a DL configured using RRC signaling.

The power setting may be set according to the PREAMBLE_TRANSMISSION_COUNTER−1 334. The PREAMBLE_TRANSMISSION COUNTER−1 may be derived from the control signaling that triggered the preamble transmission. For example, the counter may either be the received value or the received value+1. An initial transmission may use the received value [0]+1 in the control signaling. The WTRU may not apply any power ramping for the S Cell, in particular, if the WTRU is not allowed to perform any autonomous preamble retransmissions or preamble retransmissions may be eNB controlled.

If the WTRU has no valid pathloss measurement 336 for the pathloss (PL) reference used for the preamble transmission, the WTRU may determine that the transmission of a preamble may not be performed. If the WTRU determines that it experiences a low radio link quality 338, either on the associated S Cell DL or on the downlink of the serving cell used as pathloss reference, the transmission of a preamble may not be performed. For example, the radio link problems may be based on a radio link management (RLM) procedure. For example, the associated SCell DL may be the system information block 2 (SIB2)-linked SCell DL as per the semi-static configuration of the WTRU.

The WTRU may determine 370 the preamble and PRACH resource for the initial preamble transmissions, according to at least one of the following. If a dedicated preamble and a PRACH mask index was received 372 in the control signaling that initiated the preamble transmission, the WTRU may transmit the preamble in the indicated PRACH resource. Otherwise, if a dedicated preamble and a PRACH mask index are configured 374 by RRC for the concerned SCell, the WTRU may transmit the preamble in the indicated PRACH resource. Otherwise, the WTRU may either select 376 a preamble and initiate a contention-based RACH procedure, or stop the procedure 378. For example, the procedure may be stopped in the case of a false alarm or an error case. In particular, the WTRU may stop the procedure in the case that CBRA is not supported for the procedure on SCells.

The WTRU may determine 350 the subframe in which the preamble transmission may be performed. The preamble transmission may be performed at the first available occasion 352, after a fixed delay 354 corresponding to a WTRU processing time, or corresponding to the time necessary to complete activation of the corresponding SCell, if not activated already. For example, according to R8+ timing of the PCell the WTRU may, if requested by higher layers, transmit random access preamble in the first subframe n+k2, k2>=6 where a PRACH resource is available. The timing of the PCell may also apply to the preamble transmission of an SCell, when a random access procedure is initiated by a PDCCH order in subframe n.

In another example, the WTRU may perform the preamble transmission in the first subframe corresponding to n+8+k2, where k2≥0 and where a PRACH resource is available. For example, if the request for the transmission of a preamble is received before the concerned SCell is activated from reception of control signaling in subframe n, the WTRU may perform the preamble transmission in the first subframe.

If the WTRU determines 340 that a preamble may be transmitted, the WTRU may perform 342 the preamble transmission in the corresponding resource using the corresponding power settings. The WTRU may start 360 a window timer, such as a TAResponseWindow, which may be the RAR window ra-ResponseWindowSize, during which it may expect to complete the procedure.

If the preamble (re)transmission coincides with another scheduled uplink transmission, the WTRU may either scale back the power of the preamble transmission, or alternatively postpone the preamble (re)transmission to a subsequent occasion.

Figure 4:
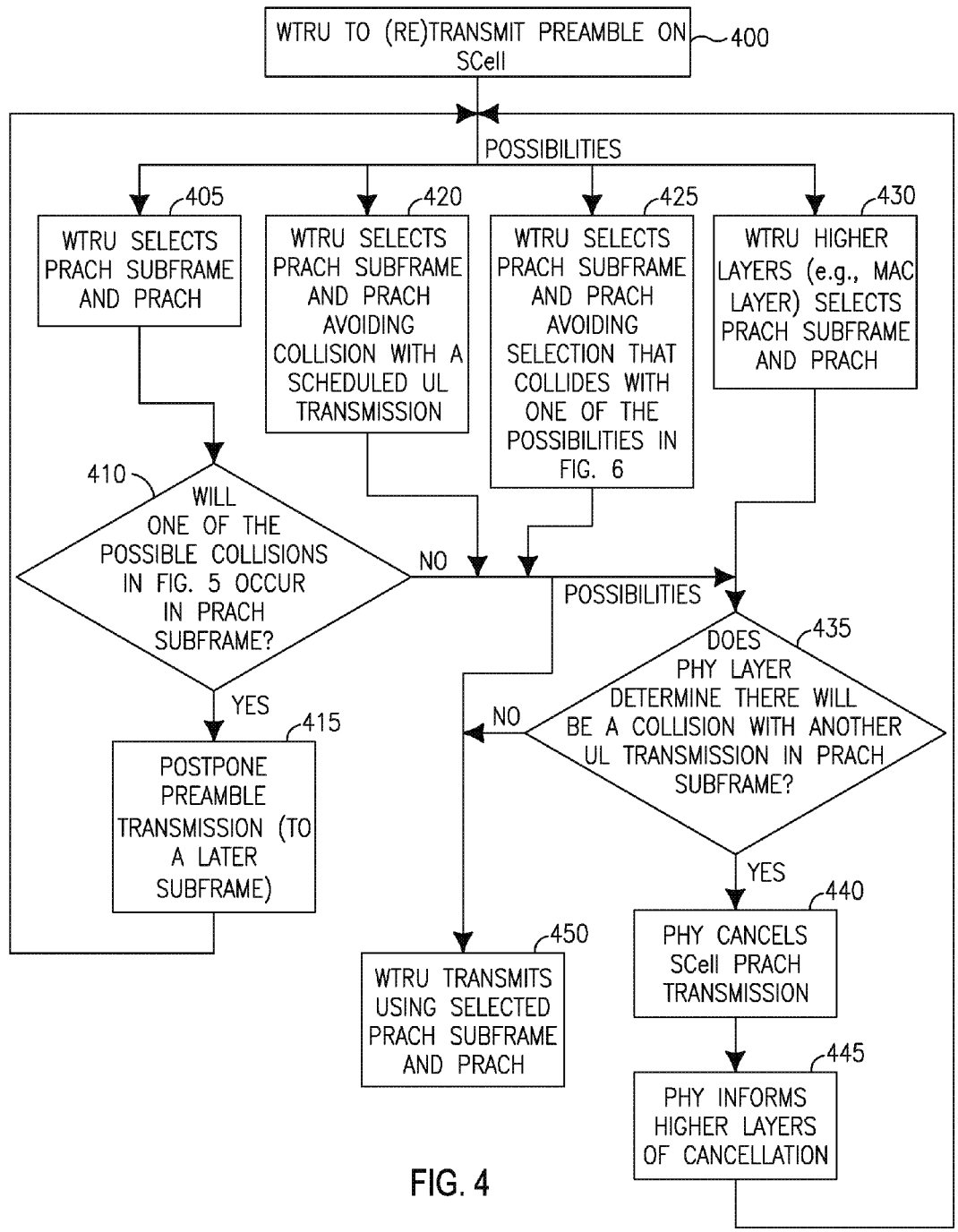
FIG. 4 is an example of options for handling or avoiding S Cell preamble collisions with other uplink transmissions.

FIG. 4 is an example of options for handling or avoiding SCell preamble collisions with other uplink transmissions. The preamble (re)transmission coinciding or "colliding" with another uplink transmission may mean that the subframe in which the preamble would be transmitted is the same subframe in which another uplink transmission would be made. The preamble (re)transmission coinciding with another uplink transmission may mean that the subframe in which the PRACH carrying the preamble would be transmitted is the same subframe in which another uplink transmission would be made. Postponing the preamble (re)transmission to a subsequent occasion may mean that the WTRU selects another, maybe later, PRACH.

In FIG. 4, the WTRU may decide to (re)transmit a preamble on an SCell at 400. The WTRU may then select a PRACH subframe and PRACH at 405. The WTRU may then determine whether there will be a collision such as one of the possible collisions shown in FIG. 5 at 410. If there is going to be a possible collision then the WTRU may postpone the preamble transmission to a later subframe at 415. If there is no collision expected, then the physical (PHY) layer of the WTRU may determine whether there will be a collision with another UL transmission in the PRACH subframe at 435. If the PHY layer determines there will be no collision, the WTRU may transmit the preamble using the selected PRACH subframe and PRACH at 450. If the PHY layer determines that there will be a collision, the PHY layer may cancel the SCell PRACH transmission at 440. The PHY layer may then inform the higher layers of the WTRU of the cancellation at 445. As an alternative, if there is no collision expected at 410, the WTRU may transmit the preamble using the selected PRACH subframe and PRACH at 450.

The WTRU may select a PRACH subframe and PRACH to avoid a collision with a scheduled UL transmission at 420. The WTRU may then transmit the preamble using the selected PRACH subframe and PRACH at 450. As an alternative, after selection of the PRACH subframe and PRACH at 420, the PHY layer of the WTRU may determine whether there will be a collision with another UL transmission in the PRACH subframe at 435. If the PHY layer determines there will be no collision, the WTRU may transmit the preamble using the selected PRACH subframe and PRACH at 450. If the PHY layer determines that there will be a collision, the PHY layer may cancel the SCell PRACH transmission at 440. The PHY layer may then inform the higher layers of the WTRU of the cancellation at 445.

The WTRU may select a PRACH subframe and PRACH to avoid a selection that may collide with one or more of the possibilities listed in FIG. 6 at 425. The WTRU may then transmit the preamble using the selected PRACH subframe and PRACH at 450. As an alternative, after selection of the PRACH subframe and PRACH at 425, the PHY layer of the WTRU may determine whether there will be a collision with another UL transmission in the PRACH subframe at 435. If the PHY layer determines there will be no collision, the WTRU may transmit the preamble using the selected PRACH subframe and PRACH at 450. If the PHY layer determines that there will be a collision, the PHY layer may cancel the SCell PRACH transmission at 440. The PHY layer may then inform the higher layers of the WTRU of the cancellation at 445.

The higher layers of the WTRU, for example, a MAC layer, may select a PRACH subframe and PRACH at 430. The physical (PHY) layer of the WTRU may determine whether there will be a collision with another UL transmission in the PRACH subframe at 435. If the PHY layer determines there will be no collision, the WTRU may transmit the preamble using the selected PRACH subframe and PRACH at 450. If the PHY layer determines that there will be a collision, the PHY layer may cancel the S Cell PRACH transmission at 440. The PHY layer may then inform the higher layers of the WTRU of the cancellation at 445.

FIG. 5 shows examples of the conditions for which the WTRU may postpone SCell preamble re(transmissions) to a subsequent occasion. The WTRU may postpone the preamble (re)transmission to a subsequent occasion if one or more of the following applies: The WTRU may postpone the preamble (re)transmission if the preamble (re)transmission coincides 510 with a scheduled UL transmission on the concerned SCell. The WTRU may postpone the preamble (re)transmission if the preamble (re)transmission coincides 515 with a scheduled UL transmission on the PCell. The WTRU may postpone the preamble (re)transmission if the preamble (re)transmission coincides 520 with a scheduled UL transmission on any serving cell. The WTRU may postpone the preamble (re)transmission if the preamble (re)transmission coincides 525 with a scheduled UL transmission on any serving cell in the same band as the concerned SCell. The WTRU may postpone the preamble (re)transmission if the preamble (re)transmission coincides 530 with any type of scheduled UL transmission. The WTRU may postpone the preamble (re)transmission if the preamble (re)transmission coincides 535 with a specific type of UL transmission such as ACK/NACK transmission. The WTRU may postpone the preamble (re)transmission if the preamble (re)transmission coincides 540 with a specific type of UL transmission such as a PUCCH transmission. The WTRU may postpone the preamble (re)transmission if the preamble (re)transmission coincides 545 with a specific type of transmission such as periodic SRS transmission. Alternatively, when PRACH transmission coincides with periodic SRS transmission in a subframe, the PRACH may be transmitted and the SRS transmission may be dropped. The WTRU may postpone the preamble (re)transmission if the preamble (re)transmission coincides 550 with a specific type of transmission such as aperiodic SRS transmission. Alternatively, when PRACH transmission coincides with an aperiodic SRS transmission in a subframe, the PRACH may be transmitted and the SRS transmission may be dropped. The WTRU may postpone the preamble (re)transmission if the preamble (re)transmission coincides 555 with a specific type of UL transmission such as periodic CSI transmission. Alternatively, when PRACH transmission coincides with periodic CSI transmission, the PRACH may be transmitted and the periodic CSI may be dropped. The WTRU may postpone the preamble (re)transmission if the preamble (re)transmission coincides 560 with a specific UL transmission such as a PRACH scheduled for transmission on another serving cell.

When selecting a PRACH, the WTRU may take into account scheduled uplink transmissions and avoid selecting a PRACH that collides with a scheduled uplink transmission. For example, the WTRU may avoid selecting a PRACH in the same subframe as a scheduled uplink transmission. FIG. 6 shows examples of transmissions a WTRU may avoid when selecting a PRACH. The WTRU may avoid selecting a PRACH that may collide with one or more of the following: The WTRU may avoid selecting a PRACH that may collide with a scheduled 610 UL transmission on the concerned SCell. The WTRU may avoid selecting a PRACH that may collide with a scheduled 615 UL transmission on the PCell. The WTRU may avoid selecting a PRACH that may collide with a scheduled 620 UL transmission on any serving cell. The WTRU may avoid selecting a PRACH that may collide with a scheduled 625 UL transmission on any serving cell in the same band as the concerned SCell. The WTRU may avoid selecting a PRACH that may collide with any type of scheduled 630 UL transmission. The WTRU may avoid selecting a PRACH that may collide with a specific type of UL transmission 635 such as ACK/NACK transmission. The WTRU may avoid selecting a PRACH that may collide with a specific type of UL transmission 640 such as a PUCCH transmission. The WTRU may avoid selecting a PRACH that may collide with a specific type of transmission 645 such as periodic SRS transmission. The WTRU may avoid selecting a PRACH that may collide with a specific type of transmission 650 such as an aperiodic SRS transmission. The WTRU may avoid selecting a PRACH that may collide with a specific type of UL transmission 655 such as periodic CSI transmission. The WTRU may avoid selecting a PRACH that may collide with a specific UL transmission 660 such as a PRACH scheduled for transmission on another serving cell.

The decision to postpone the preamble (re)transmission to a subsequent occasion may be performed by higher layers in the WTRU. The decision to postpone the preamble transmission may be made by the WTRU when it is known in advance that an UL transmission is scheduled to occur in a certain subframe or subframes. Avoiding selection of a PRACH that may collide with another uplink transmission occasion may be performed by higher layers in the WTRU. The WTRU may avoid selection of a PRACH that may collide with another uplink transmission when it is known in advance that UL transmission is scheduled to occur in a certain subframe or subframes. As an example, higher layers in the WTRU may be or may include the MAC layer.

The decision to postpone the preamble (re)transmission may be performed by the WTRU at the physical layer. For example, the WTRU PHY layer may postpone or decided to postpone the preamble (re)transmission, if after the higher layers (e.g., the MAC) provide a PRACH resource to the physical layer, an UL transmission is scheduled such as in response to an UL or DL grant (e.g., ACK/NACK). The WTRU physical layer may determine that PRACH transmission is not possible in the designated subframe, for example, due to a collision with another UL transmission and may cancel the PRACH transmission.

The WTRU physical layer may inform the higher layers that PRACH transmission is not possible in a designated subframe. The physical layer may inform the higher layers that the PRACH transmission was cancelled. The WTRU, for example, he higher layers of the WTRU, may choose another PRACH resource if PRACH transmission was cancelled. For example, the higher layers may be or may include the MAC layer. When a PRACH transmission is cancelled, the WTRU may choose another PRACH resource without updating one or more of the timers and counters relating to the random access procedure such as the PREAMBLE_TRANSMISSION_COUNTER.

The WTRU may maintain a counter to keep track of the consecutive number of times the PRACH transmission is cancelled. The WTRU may maintain a timer to keep track of how long the WTRU is unable to transmit the PRACH due to collisions with other uplink transmissions. If the WTRU is unable to transmit the PRACH after a number of attempts, for example, based on the counter counting the number of cancellations, or after a period of time, due to collisions with other uplink transmissions, the WTRU may cease attempting to transmit the PRACH and may inform the eNB via signaling, such as via RRC or MAC signaling. This may, for example, be applicable when the eNB had requested the WTRU to perform a random access procedure for example for the purpose of timing alignment.

The WTRU may postpone the PRACH transmission if WTRU maximum power would be exceeded in the subframe in which the PRACH is to be transmitted. The WTRU may determine the required transmit power for each channel to be transmitted in a given subframe; and if in that subframe there is a PRACH scheduled to be transmitted, the WTRU may do one or more of the following. The WTRU may determine if the WTRU maximum allowed transmit power would be exceeded if all channels were transmitted simultaneously including the PRACH. If the WTRU maximum allowed transmit power would be exceeded and a PRACH transmission is scheduled, the WTRU may cancel the PRACH transmission. If the PRACH transmission is cancelled, the WTRU may determine if the maximum WTRU power would be exceeded for the scheduled channels excluding the PRACH and proceed with scaling as needed based on the scheduled channels other than the PRACH. The WTRU maximum allowed transmit power may be the WTRU maximum configured output power, Pcmax, as defined in LTE. The WTRU maximum allowed output power may be the WTRU power class power.

When the WTRU is transmitting in multiple bands, a determination as to whether maximum allowed transmit power would be exceeded may be performed on an individual band basis instead of being performed on a WTRU basis. The determination may also first be performed on an individual band basis and then performed on a WTRU basis. When performing the determination on an individual band basis, the maximum allowed power for the band may be used to determine whether the maximum allowed transmit power would be exceeded.

If the PRACH transmission coincides with another transmission and the simultaneous transmission is permitted, if band and/or WTRU maximum output power would be exceeded, the WTRU may scale the power of the PRACH based on its priority relative to the other channels being transmitted. In the R10 channel prioritization, a PUCCH has the highest priority, a PUSCH with a UCI has the next highest priority, and a PUSCH without a UCI has the lowest priority.

A PRACH may be given a priority such that one or more of the following applies. A PRACH may be transmitted if there is available power after power is allocated to channels with higher priority. If after power is allocated to higher priority channels, there is not enough power to transmit the PRACH without scaling, the PRACH may be scaled. If after power is allocated to higher priority channels, there is not enough power to transmit the PRACH without scaling, the PRACH transmission may be cancelled. If PRACH transmission is cancelled, the remaining lower priority channels, may be transmitted with power allocation and scaling as needed. If PRACH is scaled, the remaining lower priority channels, may be dropped.

In one example, a PRACH may have the next highest priority after a PUSCH with a UCI. In this example, if maximum power may be exceeded, (band and/or WTRU maximum output power), and if all channels scheduled to be transmitted in a subframe were to be transmitted, one or more of the following may apply. Power may first be allocated to any PUCCH. After allocation of power to any PUCCH, any remaining power may be allocated to PUSCH with UCI. If there is not enough power for PUSCH with UCI, the PUSCH with UCI may be scaled and no other channels would be transmitted. In this case, the PRACH may be cancelled. If there is remaining power after allocation to any PUCCH and PUSCH with UCI, power may be allocated to any PRACH. If there is not enough power for any PUCCH plus any PUSCH with UCI plus PRACH, the PRACH may be scaled and any PUSCH without UCI may not be transmitted. If there is not enough power for any PUCCH plus any PUSCH with UCI plus PRACH, the PRACH transmission may be cancelled. If PRACH transmission is cancelled, PUSCH without UCI, may be transmitted with power allocation and scaling as needed. If there is power remaining after allocating power to PRACH, PUSCH without UCI may be transmitted with scaling if needed.

Power allocation and/or scaling may be performed on a band basis and/or a WTRU basis.

Figure 7:
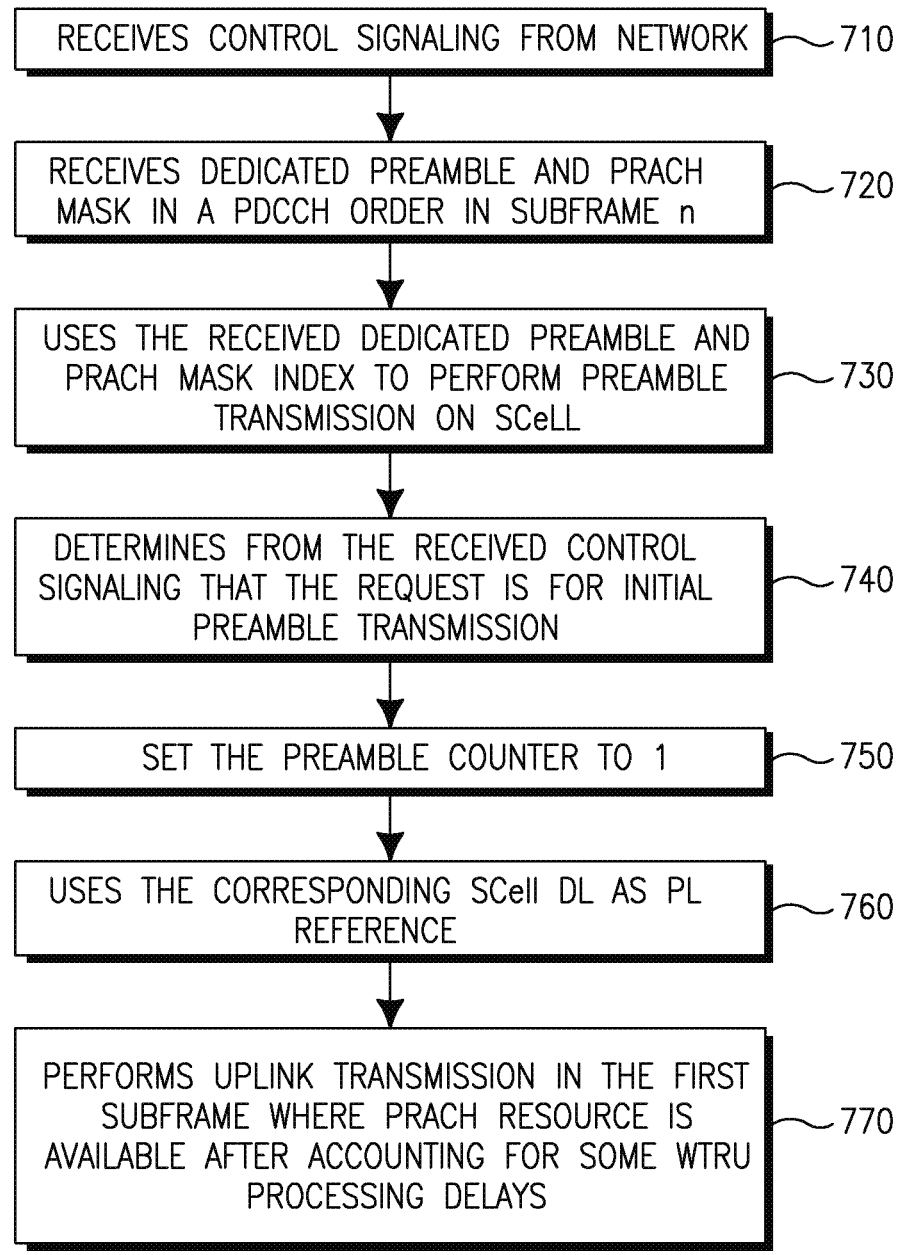
FIG. 7 shows an example of the WTRU using a dedicated preamble and PRACH mask index to perform preamble transmission on the SCell.

FIG. 7 shows an example of the WTRU using a dedicated preamble and PRACH mask index to perform preamble transmission on the S Cell. In one example, the WTRU may receive 710 control signaling from the network. The WTRU may also receive 720 a dedicated preamble and PRACH mask in a PDCCH order in subframe n. The WTRU may use 730 the dedicated preamble and a PRACH mask index received in a PDCCH order in subframe n to perform the preamble transmission on the SCell. The WTRU may determine 740 from the received control signaling, for example, codepoint 0, that the request is for an initial preamble transmission and sets 750 the preamble counter to 1, thereby the WTRU may not apply any power ramping. The WTRU may use 760 the corresponding S Cell DL as the PL reference, and perform 770 the uplink transmission in the first subframe n+k2, k2≥6 where a PRACH resource is available.

The WTRU may determine that a preamble may be retransmitted according to at least one of the following methods. The WTRU receives control signaling, which indicates that the preamble transmission is for a retransmission. The WTRU may autonomously initiate the retransmission of a preamble, for example upon failure to complete the procedure according to the embodiments described below. The WTRU may start a window timer, for such as, a TAResponseWindow, which may be the RAR window raResponseWindowSize, during which it may expect to complete the procedure.

In one example, a WTRU may not be allowed to autonomously perform any preamble retransmissions on the uplink resources of an SCell. A WTRU may perform a preamble retransmission when initiated by reception of control signaling. In another example, the WTRU may autonomously perform preamble retransmission for an SCell. The WTRU may autonomously perform preamble retransmission up to a maximum number of attempts if, following an initial preamble transmission, the WTRU has not received after a specific amount of time any time advance command (TAC) or any uplink grant for an SCell within the TAG of the SCell on which the preamble was transmitted.

When the WTRU performs a preamble retransmission, it may apply power ramping. For autonomous retransmissions, the power ramping may be applied similarly to that of the PCell, for example, using a counter to count the number of attempts. For retransmission requested by the eNB using control signaling, the WTRU may apply a stepwise increase if the control signaling indicates that the WTRU needs to ramp-up the power, use a counter of the number of attempts, or use an indication in the control signaling to determine the exact power ramping to apply. The counter of the number of attempts may be reset to its initial value when the WTRU initiates the first transmission of a preamble for the procedure. The counter of the number of attempts may also be reset to its initial value upon deactivation of the corresponding SCell, upon activation of the corresponding SCell, upon configuration or reconfiguration of the corresponding SCell, upon configuration or reconfiguration of the TAG of the S Cell, or when the procedure completes successfully. The power ramping may be limited up to a maximum value.

Figure 8:
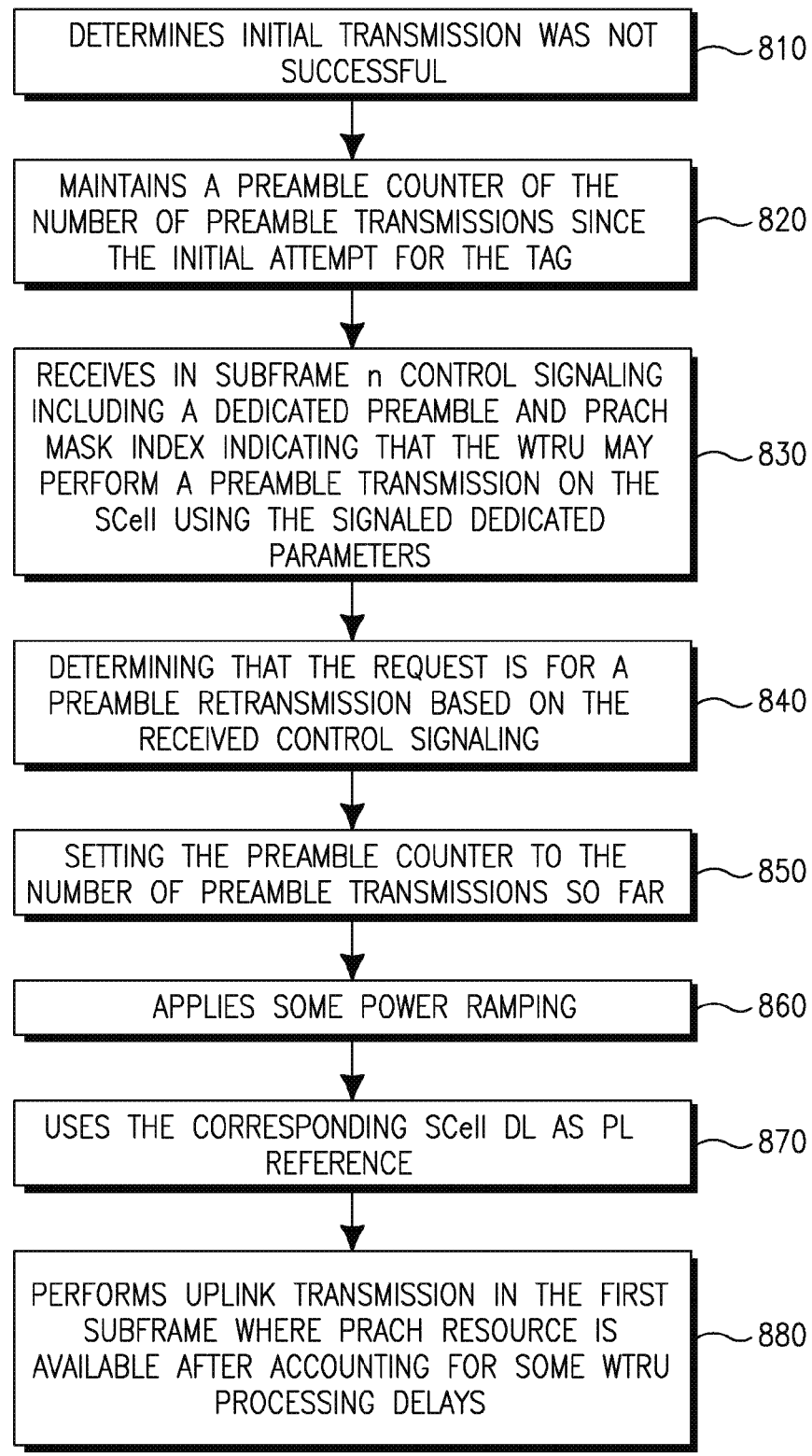
FIG. 8 is an example of a network-controlled dedicated preamble retransmission.

FIG. 8 is an example of a network-controlled dedicated preamble retransmission. The WTRU may determine 810 that the initial preamble transmission was not successful, for example, based on the expiration of the window, for example, a TAResponse-window, and may have discarded the dedicated preamble and PRACH mask index used for the initial preamble transmission. The WTRU may maintain 820 a preamble counter of the number of preamble transmissions since the initial attempt for the TAG. The WTRU may receive 830 in subframe n control signaling that includes a dedicated preamble and a PRACH mask index which indicates that the WTRU performs a preamble retransmission on the S Cell using the signaled (maybe different than for the previous transmission) dedicated parameters. The WTRU may determine 840 from the control signaling, for example, codepoint 1, that the request is for a preamble retransmission and set 850 the preamble counter to the number of preamble transmissions performed so far for the TAG+1 (i.e., the counter is increased by one unit for every preamble transmission until the counter is reset). The WTRU may therefore apply 860 some power ramping. The WTRU may use 870 the corresponding SCell DL as the PL reference, and perform 880 the uplink transmission in the first subframe n+k2, k2≥6 where a PRACH resource is available.

In another example of a network-controlled dedicated preamble retransmission, the WTRU may receive in subframe n control signaling that includes a dedicated preamble and a PRACH mask index which indicates that the WTRU performs a preamble retransmission on the S Cell using the signaled (maybe different than for the previous preamble transmission) dedicated parameters. The WTRU may determine from the control signaling, for example, codepoint, 2 that the request is for a preamble retransmission corresponding to a second retransmission in a sequence of preamble transmissions performed for the TAG, independently of how many preamble transmissions actually took place since the WTRU has initiated the procedure. The WTRU may then apply the power ramping that corresponds to the preamble transmission in the sequence. The WTRU may use the corresponding SCell DL as the PL reference, and perform the uplink transmission in the first subframe n+k2, k2≥6 where a PRACH resource is available and according to the PRACH mask index.

The WTRU may determine whether or not the procedure involving the transmission of a preamble is complete. The procedure may be for gaining uplink synchronization, an RACH procedure, or any of the procedures including one of the examples described above. The WTRU may determine either the RACH procedure or the procedure for gaining uplink timing alignment has completed using the 3GPP R8+ methods. In particular, the WTRU may use the 3GPP r8+ methods in the case of a contention-based procedure on the S Cell.

Alternatively, the WTRU may determine that the procedure is completed according to the reception of RAR or other events not involving RAR. The reception of the RAR may be considered, if the WTRU decodes a DCI in the CSS of the PDCCH of a serving cell. The WTRU may then be scheduled with an RAR from the reception of a PDCCH DCI on the CSS of a PCell, which may include the CIF of the corresponding S Cell (or an SCell in the same TAG). The reception of the RAR may also be considered if the WTRU may be scheduled with an RAR from the reception of a PDCCH DCI on the CSS of an SCell. Alternatively, the reception of the RAR is counted for an SCell for which the WTRU is configured with a RACH configuration. Alternatively, the reception of the RAR is counted while a timer is running, such as an RAR window which includes subframes after the transmission of a preamble and until successful reception of the RAR or expiration of the timer.

Other events for consideration of the procedure completion may be timer-based completion, maximum number of preamble retransmissions, reception of control signaling on PDCCH, reception of MAC control signaling, or contention resolution. For example, reception of control signaling on PDCCH may be reception of an uplink grant, reception of a request for an aperiodic SRS transmission or reception of a DCI scrambled with a specific RNTI. For example, reception of MAC control signaling may be MAC TAC CE, MAC RAR, or other MAC CE. For example, contention resolution may be used if CBRA is used.

The completion of the procedure may be bound by the occurrence of at least one of the above or until a specific time has elapsed, for example, by a reception window, whichever comes first. For example, if the WTRU does not successfully complete the procedure during the allocated window, it may determine either that the procedure is not successful and/or that the procedure has failed. In the case where the procedure is determined not successful, the WTRU may perform an autonomous retransmission or perform no further actions. If the procedure is not successful, the WTRU may perform an autonomous retransmission after a certain backoff or may deactivate one or more SCells of the concerned TAG. In the case where the procedure has failed, the WTRU may discard the explicitly signaled dedicated preamble (ra-PreambleIndex) and PRACH mask index (PRACH-Mask-index), deactivate one or more SCells of the concerned TAG, or perform no further actions. The WTRU may keep the SCell(s) in their current activation state, and may monitor the PDCCH for further control signaling that may order a preamble retransmission for the concerned SCell, or TAG.

The WTRU may restart the applicable TA timer where the procedure completes successfully. For example, the WTRU may restart the TA timer when a TAC is received in the transmission of a preamble, either in an RAR or in a MAC CE. The WTRU may reset a counter of preamble transmission to its initial value, for example reset to 0.

Figure 9:
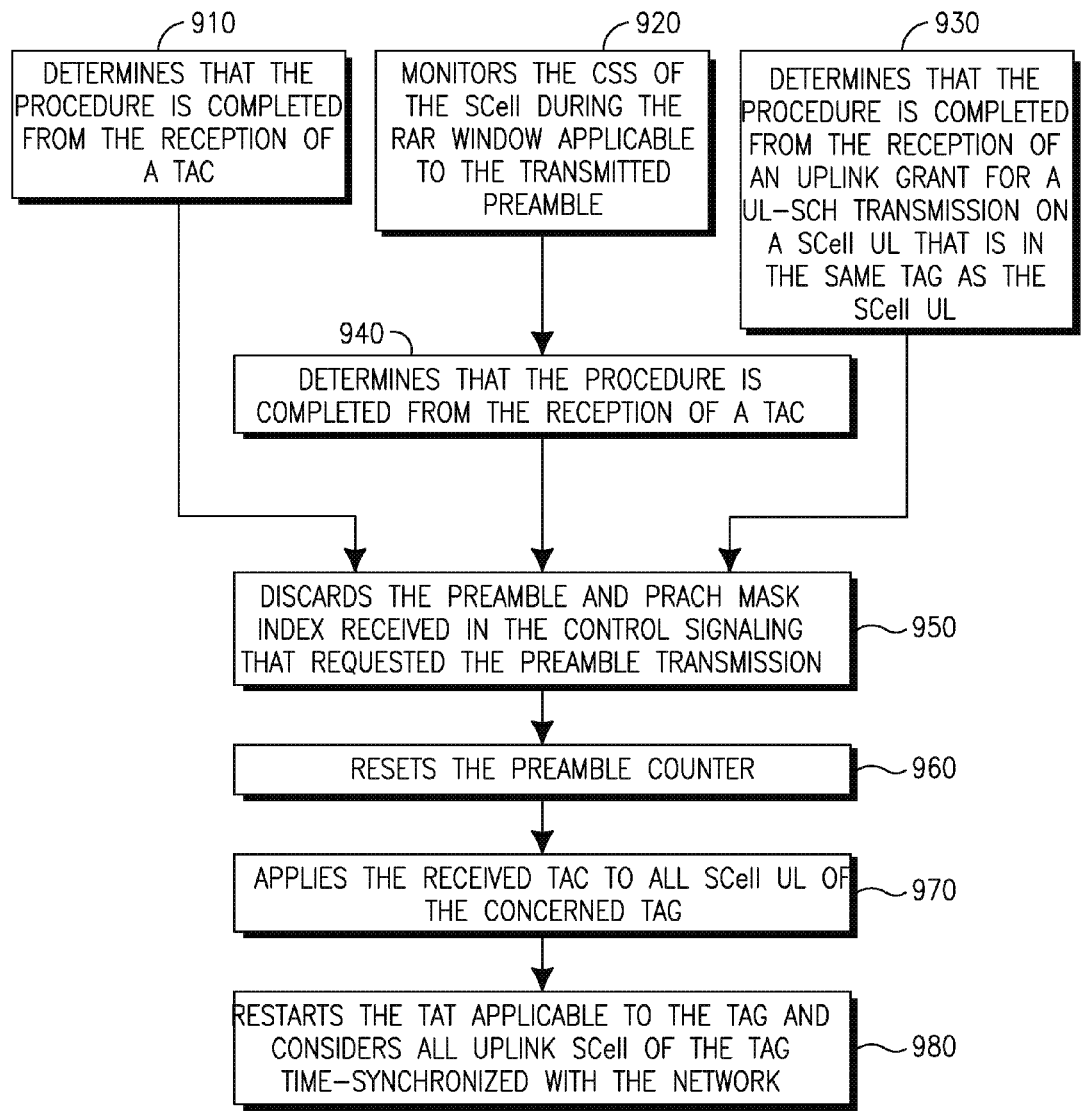
FIG. 9 is an example of method to determine completion of the network-controlled procedure.

FIG. 9 is an example method to determine completion of the network-controlled procedure. The WTRU may determine 910 that the procedure is completed from the reception of a TAC using C-RNTI in WTRUSS. The WTRU may monitor 920 the CSS of the SCell during the RAR window applicable to the transmitted preamble using RA-RNTI in CSS. Alternatively, the WTRU may monitor the CSS of the PCell during the RAR window applicable to the transmitted preamble using RA-RNTI in CSS. The WTRU may then determine 940 that the procedure is completed based on the reception of a TAC. The WTRU may determine 930 that the procedure is completed from the reception of an uplink grant for an uplink shared channel (UL-SCH) transmission on an SCell UL that is in the same TAG as the SCell UL. After performing any one of steps 910, 930, or 940, the WTRU may then discard 950 the preamble and PRACH mask index received in the control signaling that requested the preamble transmission. The WTRU may reset 960 the preamble counter. The WTRU may then apply 970 the received TAC to all SCell UL o the concerned TAG. The WTRU may restart 980 the TA timer applicable to the TAG and consider all uplink S Cells of the TAG time-synchronized with the network.

In one example, the WTRU may determine that the procedure is completed from the reception of a TAC. The WTRU may receive the TAC in a MAC PDU as a MAC TAC CE that includes a TAC for the concerned TAG and scheduled using a DCI scrambled with the WTRU's C-RNTI on the WTRUSS of the PDCCH of any activated serving cell. The WTRU may discard the dedicated preamble and PRACH-mask index received in the control signaling that requested the preamble transmission, and reset a preamble counter. The WTRU may apply the received TAC to all SCell UL of the concerned TAG. The WTRU may restart the TA timer applicable to the TAG and consider all uplink SCells of the TAG time-synchronized with the network.

In another example, the WTRU may monitor the CSS of the SCell during the RAR window applicable to the transmitted preamble. The WTRU may determine that the procedure is completed from the reception of a TAC. The WTRU may receive the TAC in a MAC RAR that includes a TAC for the concerned TAG and scheduled using a DCI scrambled with the WTRU's RA-RNTI on the CSS of the PDCCH of any activated serving cell. The WTRU may discard the dedicated preamble and PRACH-mask index received in the control signaling that requested the preamble transmission, and reset the preamble counter. The WTRU may apply the received TAC to all SCell UL of the concerned TAG. The WTRU may restart the TA timer applicable to the TAG and considers all uplink S Cells of the TAG time-synchronized with the network.

In another example, the WTRU may determine that the procedure is completed from the reception of an uplink grant for an UL-SCH transmission on an SCell UL that is in the same TAG as the SCell UL on which the dedicated preamble was transmitted. The WTRU may discard the dedicated preamble and PRACH-mask index received in the control signaling that requested the preamble transmission, and reset the preamble counter. The WTRU may restart the TA timer applicable to the TAG and consider all uplink SCells of the TAG time-synchronized with the network.

For a preamble transmission on a PCell, the WTRU may perform RAR reception. Once the Random Access Preamble is transmitted, regardless of the possible occurrence of a measurement gap, the WTRU may monitor the PDCCH of the PCell for Random Access Responses identified by the RA-RNTI. The WTRU may monitor the PDCCH in the RA Response window which starts at the subframe containing the end of the preamble transmission plus three subframes and has a length of ra-ResponseWindowSize subframes. The RA-RNTI associated with the PRACH in which the Random Access Preamble is transmitted, is computed as:

$$RA\text{-}RNTI = 1 + t\_id + 10 * f\_id \qquad \text{Equation (1)}$$

where t_id is the index of the first subframe of the specified PRACH (0≤t_id<10), and f_id is the index of the specified PRACH within that subframe, in ascending order of frequency domain (0≤f_id<6). The WTRU may stop monitoring for Random Access Responses after successful reception of a Random Access Response containing Random Access Preamble identifiers that matches the transmitted Random Access Preamble.

Upon reception of an RAR that corresponds to a preamble transmitted on an S Cell, the WTRU may determine that the procedure is successfully completed.

For an SCell, the WTRU may decode the PDCCH for a message 2 (msg2), for example, an RAR or a MAC TAC CE, according to at least one of the following. The WTRU may monitor for a DCI in the CSS of the PDCCH of the PCell DL. The WTRU may attempt to decode the DCI using a RA-RNTI. The DCI may include a CIF for the cross-carrier scheduling of the RAR on the PDSCH of the cell corresponding to the CIF, for example, the S Cell on which the preamble was transmitted. For example, the DCI for RAR for the preamble transmission on an SCell may be received on the PDCCH of the PCell scrambled using RA-RNTI.

The WTRU may monitor for a DCI in the WTRUSS of the PDCCH of the PCell DL. The WTRU may attempt to decode the DCI using the WTRU's C-RNTI. The DCI may include a CIF for the cross-carrier scheduling of the msg2 on the PDSCH of the cell corresponding to the CIF, for example, the S Cell on which the preamble was transmitted. For example, the DCI for RAR for the preamble transmission on an S Cell may be received on the PDCCH of the PCell scrambled using the WTRU's C-RNTI. As another example, the DCI for MAC TAC CE for the preamble transmission on an S Cell may be received on the PDCCH of the PCell scrambled using the WTRU's C-RNTI.

The WTRU may monitor for a DCI in a CSS of the PDCCH of an SCell DL. The CSS may be defined in a similar manner as for the PDCCH of the PCell. The WTRU may attempt decoding for DCI during a specific number of subframes, for example, during the reception window of the RAR on the PDCCH of an SCell. The WTRU may attempt decoding for DCI for an RA-RNTI. The SCell DL may correspond to the SCell for which the preamble was transmitted, or may correspond to any SCell of the same TAG as the SCell for which the preamble was transmitted. The WTRU may attempt to decode the DCI using an RA-RNTI. The DCI may include a CIF for the cross-carrier scheduling of the RAR on the PDSCH of the cell corresponding to the CIF, for example, the S Cell on which the preamble was transmitted. For example, the DCI for RAR for the preamble transmission on an SCell may be received on the PDCCH of an SCell scrambled using the RA-RNTI.

The WTRU may monitor for a DCI in a WTRUSS of the PDCCH of an S Cell DL. The S Cell DL may correspond to the S Cell for which the preamble was transmitted, or may correspond to any SCell of the same TAG as the S Cell for which the preamble was transmitted. The WTRU may attempt to decode the DCI using the WTRU's C-RNTI. The DCI may include a CIF for the cross-carrier scheduling of the msg2 on the PDSCH of the cell corresponding to the CIF, for example, the SCell on which the preamble was transmitted. For example, the DCI for RAR for the preamble transmission on an S Cell may be received on the PDCCH of an SCell scrambled using the WTRU's C-RNTI. As another example, the DCI for MAC TAC CE for the preamble transmission on an S Cell may be received on the PDCCH of an SCell scrambled using the WTRU's C-RNTI.

The DCI may be scrambled, either with the C-RNTI of the WTRU or with a RA-RNTI. The DCI may be scramble with the C-RNTI of the WTRU if the DCI is received in the CSS or WTRUSS of the corresponding PDCCH. The DCI may be scrambled with a RA-RNTI if the DCI is received in the CSS of the corresponding PDCCH. In particular, if CFRA is possible, the WTRU may use C-RNTI to decode a DCI pertaining to the msg2.

The WTRU may monitor a PDCCH for the RAR using specific aggregation levels, for example, AL4 and AL8.

The RA-RNTI, if used, may be derived using at least one of the following. The WTRU may derive the RA-RNTI at least in part using an index of the first subframe of the specified PRACH, or the index of the specific PRACH (similar to a case where the preamble transmission would have been performed on the PCell UL). Alternatively, the RA-RNTI may be derived at least in part using an index of the serving cell on which the preamble was transmitted. For example, this may be done by adding the value of the corresponding servCellIndex. Alternatively, the RA-RNTI may be derived at least in part using an index of the TAG of the serving cell on which the preamble was transmitted. For example, this may be done by adding the value of the corresponding ta-groupIndex. Alternatively, the RA-RNTI may be derived using an additional value configured by RRC for the WTRU.

If a DCI is successfully decoded for a msg2 corresponding to an SCell, either on the PDCCH of the PCell or of the SCell, the DCI may include a CIF. The received DCI may cross-carrier the msg2, in particular, if C-RNTI is used to schedule the msg2.

In the case of cross-carrier scheduling for RACH on the SCell, as the number of HARQ process bits are 3 bits, same size as for CIF, which are reserved in case of format 1A using RA-RNTI, instead of including the 3 bit CIF field in the PDCCH, the reserved HARQ process number field may be replaced with the 3 bit CIF. The WTRU may use the HARQ process bits in the DCI format to determine to what SCell the received control signaling is applicable.

In LTE R8+, the MAC RAR is defined as follows: A MAC PDU includes a MAC header and zero or more MAC Random Access Responses (MAC RAR) and optionally padding. The MAC header is of variable size.

A MAC PDU header includes one or more MAC PDU subheaders; each subheader corresponding to a MAC RAR except for the Backoff Indicator subheader. If included, the Backoff Indicator subheader is only included once and is the first subheader included within the MAC PDU header.

The MAC header may be of variable size and includes the following fields: E, T, R, BI, and RAPID. E may be the Extension field wherein a flag indicates if more fields are present in the MAC header or not. The E field may be set to "1" to indicate at least another set of E/T/RAPID fields follows. The E field may be set to "0" to indicate that a MAC RAR or padding starts at the next byte.

T may be the Type field wherein a flag indicates whether the MAC subheader contains a Random Access ID or a Backoff Indicator. The T field may be set to "0" to indicate the presence of a Backoff Indicator field in the subheader (BI). The T field may be set to "1" to indicate the presence of a Random Access Preamble ID field in the subheader (RAPID).

R may be the Reserved bit, set to "0". BI may be the Backoff Indicator field that identifies the overload condition in the cell. The size of the BI field may be 4 bits. RAPID may be the Random Access Preamble IDentifier field that identifies the transmitted Random Access Preamble. The size of the RAPID field may be 6 bits. The MAC header and subheaders are octet aligned.

Figure 10:
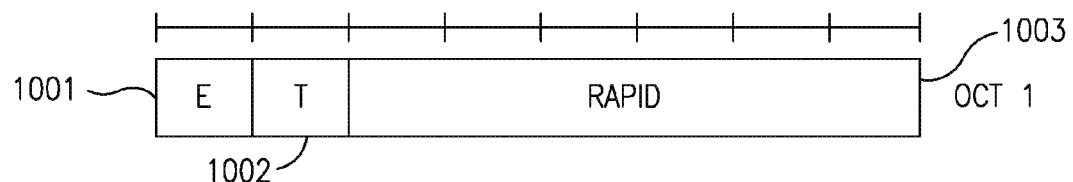
FIG. 10 is an example E/T/RAPID MAC subheader.
Figure 11:
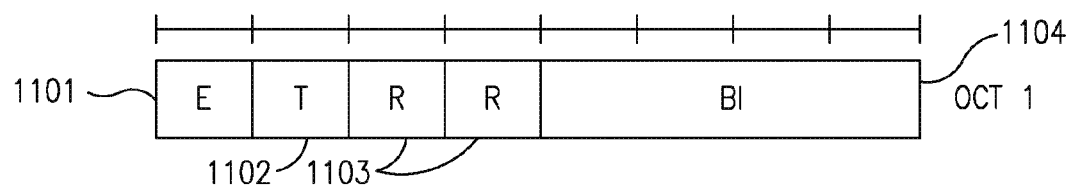
FIG. 11 is an example E/T/R/R/BI MAC subheader.

FIG. 10 is an example E/T/RAPID MAC subheader. A MAC PDU subheader may consist of the three header fields E/T/RAPID as illustrated in FIG. 10. Octet 1 in FIG. 10 includes three header fields E 1001, T 1002, and RAPID 1003. FIG. 11 is an example E/T/R/R/BI MAC subheader. A MAC PDU subheader may consist of three header fields, but for the Backoff Indicator (BI) subheader which includes the five header field E/T/R/R/BI as illustrated in FIG. 11. Octet 1 in FIG. 11 includes five header fields, E 1101, T 1102, R 1103, R 1103, and BI 1104.

Figure 12:
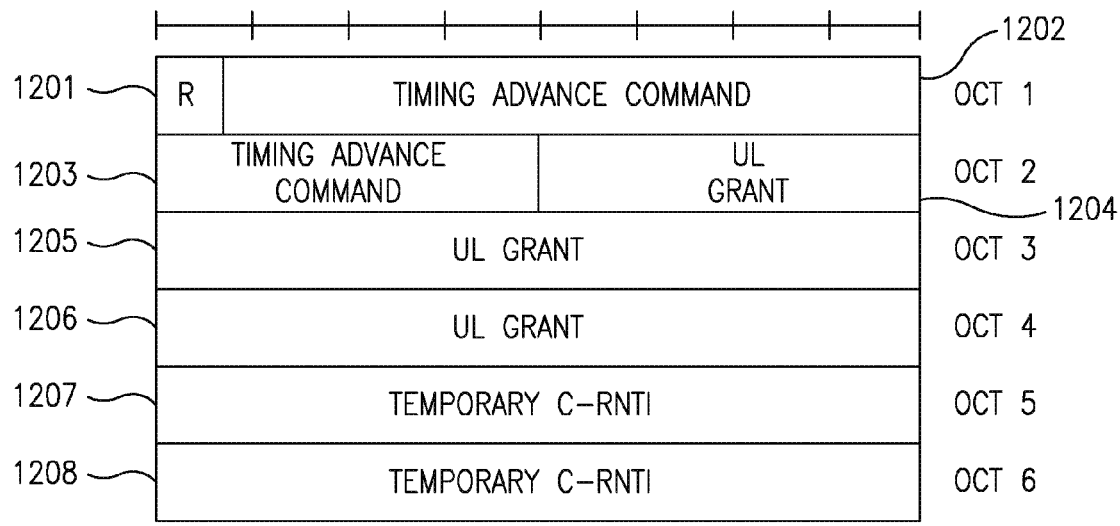
FIG. 12 is an example MAC RAR.

FIG. 12 is an example MAC RAR. A MAC RAR may include the four fields R/Timing Advance Command/UL Grant/Temporary C-RNTI as illustrated in FIG. 12. The timing Advance Command field may indicate the index value, $T_A$ (0, 1, 2, . . . 1282), used to control the amount of timing adjustment that the WTRU may have to apply. The size of the Timing Advance Command field may be 11 bits. The UL Grant field may indicate the resources to be used on the UL. The size of the UL Grant field may be 20 bits. The Temporary C-RNTI field may indicate the temporary identity that is used by the WTRU during Random Access. The size of the Temporary C-RNTI field may be 16 bits.

Octet 1 in FIG. 12 includes R 1201 and Timing Advance Command 1202. Octet 2 in FIG. 12 includes Timing Advance Command 1203 and UL Grant 1204. Octet 3 in FIG. 12 includes UL Grant 1205. Octet 4 in FIG. 12 includes UL Grant 1206. Octet 5 in FIG. 12 includes Temporary C-RNTI 1207. Octet 6 in FIG. 12 includes Temporary C-RNTI 1208. Padding may occur after the last MAC RAR. Presence and length of padding is implicit based on TB size, size of MAC header and number of RARs.

A MAC PDU for RAR may additionally include at least one of the following: an identity of the SCell for which the RAR is applicable or a TAG identifier of the SCell for which the RAR is applicable. The identity of the SCell may be WTRU-specific, for example, it may correspond to the servCellIndex or it may correspond to the CIF. The identity of the SCell may be cell-specific such as a cell identity. The identity of a TAG identifier may be WTRU-specific, for example, it may correspond to a configured TAG identity.

For example, a WTRU may receive a MAC PDU containing an RAR with an identity of the SCell for which the RAR is applicable. The MAC PDU may be cross-scheduled on the PDCCH of the PCell using a DCI scrambled with the WTRU's C-RNTI. Alternatively, the MAC PDU may be scheduled using a DCI scrambled with a RA-RNTI.

The WTRU may use a window or a timer during which it expects reception of control signaling that completes the procedure. Upon expiration of the timer, if the WTRU has not received any such control signaling, the WTRU may determine that a preamble retransmission may be performed, if WTRU-autonomous retransmission are allowed. Alternatively, the WTRU may determine that the procedure has completed. For example, the WTRU may determine that the procedure was either unsuccessful or has failed.

If the WTRU performs preamble retransmission for an SCell, either autonomously or under the control of the eNB, and the WTRU determines that it has reached the maximum number of preamble transmissions without successfully completing the procedure, the WTRU may determine that the procedure is either unsuccessful or has failed. The maximum number of preamble transmissions may be configured by higher layers.

The WTRU may determine that the procedure is successful upon reception of control signaling on PDCCH. Upon reception of control signaling on PDCCH that corresponds to a preamble transmitted on an SCell, the WTRU may determine that the procedure is successfully completed.

The WTRU may determine that the procedure is successful if the WTRU receives a grant for an uplink transmission on an S Cell of the TAG that corresponds to the S Cell UL on which the preamble was transmitted. For example, reception of a DCI format indicating an uplink transmission, which may be received either on the PDCCH of the SCell or on another serving cell using cross-carrier scheduling. The DCI format may be format 0. The WTRU may determine that the procedure is successful if the WTRU receives a request for an aperiodic SRS on an S Cell of the TAG that corresponds to the SCell UL on which the preamble was transmitted. For example, a reception of the request may be received either on the PDCCH of the SCell or on another serving cell using cross-carrier scheduling.

The WTRU may determine that the procedure is completed upon receipt of a request for initiating the transmission of a preamble on another SCell of the TAG that corresponds to the S Cell UL on which the preamble was transmitted. In particular, the WTRU may determine the procedure is successful upon receipt of any of the above case where a dedicated preamble is used for the transmission of a preamble on an SCell. The WTRU may determine that the procedure is successful, if the control signaling indicating an uplink transmission is received in the time specified for the completion of the procedure, for example, a window.

The WTRU may determine that the procedure is successful if the WTRU receives a DCI format scrambled with the WTRU's C-RNTI for the S Cell. The WTRU may determine that the procedure is successful if the WTRU receives a DCI format scrambled with the RA-RNTI that corresponds to the preamble transmitted for the SCell. The WTRU may determine that the procedure is successful if the WTRU receives a DCI format scrambled with a specific RNTI, which RNTI indicates termination of the procedure, for example a TA-RNTI. In particular the WTRU may determine that the procedure is successful where a dedicated preamble is used for the transmission of a preamble on an SCell, or if the control signaling indicates an uplink transmission is received in the time specified for the completion of the procedure. For example, the time specified for the completion of the procedure may be a window. The control signaling may indicate to the WTRU that the eNB has successfully received the transmitted preamble.

The WTRU may determine that the procedure is successful upon reception of MAC control signaling. The WTRU may determine that the procedure is successful upon reception of a MAC PDU that contains at least a TAC applicable to the SCell and/or TAG of the S Cell for which a preamble was transmitted. For example, a TAC applicable to the S Cell may be inside a MAC TAC CE control element or inside a MAC RAR. The MAC PDU may be received on the PDSCH of an SCell DL that is part of the concerned TAG, for example, the PDSCH of the SCell DL that corresponds to the SCell UL on which the preamble was transmitted, or on the PDSCH of any serving cell. The WTRU may determine that the procedure is successful upon reception of MAC control signaling in case a dedicated preamble is used for the transmission of a preamble on an SCell. For example, if the corresponding MAC control signaling is received in the time specified for the completion of the procedure, for example, a window. Upon reception of MAC control signaling that corresponds to a preamble transmitted on an SCell, the WTRU may determine that the procedure is successfully completed.

If the WTRU is allowed to transmit a preamble that is selected by the MAC, such as a contention-based procedure, the WTRU may determine that the procedure is successful according to similar criterion as for the contention-based procedure of 3GPP R8+. For example, in the contention-based procedure of 3GPP R8+ when the WTRU either the contention-based procedure is successful, or otherwise the contention-based procedure fails.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An evolved Node B (eNodeB) comprising:
a transmitter configured to transmit, on a primary cell (PCell), a physical downlink control channel (PDCCH) order to a wireless transmit receive unit (WTRU), wherein the PDCCH order includes a carrier indicator field indicating a secondary cell (SCell) to transmit a physical random access channel (PRACH) transmission and the PDCCH order is transmitted using a downlink control information (DCI) format 1A;
a receiver configured to receive the PRACH transmission from the WTRU on the indicated SCell, wherein on a condition that the PRACH transmission coincides with a scheduled sounding reference signal (SRS) transmission of the WTRU, the receiver is further configured to either receive the PRACH transmission alone or in combination with the SRS transmission; and
the transmitter, in response to the PRACH transmission received on the secondary cell, configured to transmit on the PCell a random access response (RAR), wherein the RAR includes a timing advance to adjust a timing of the WTRU for the SCell.

2. The eNodeB of claim 1 wherein the RAR includes a timing advance to adjust a timing of a plurality of SCells and not the PCell.

3. The eNodeB of claim 2 wherein the plurality of SCells are in a same timing advance group.

4. The eNodeB of claim 1 wherein the PDCCH order includes an indication of a dedicated preamble and a PRACH mask index.

5. A method performed by an evolved Node B (eNodeB), the method comprising:
transmitting, on a primary cell (PCell), a physical downlink control channel (PDCCH) order to a wireless transmit receive unit (WTRU), wherein the PDCCH order includes a carrier indicator field indicating a secondary cell (SCell) to transmit a physical random access channel (PRACH) transmission and the PDCCH order is transmitted using a downlink control information (DCI) format 1A;
receiving the PRACH transmission from the WTRU on the indicated SCell, wherein on a condition that the PRACH transmission coincides with a scheduled sounding reference signal (SRS) transmission of the WTRU, receiving the PRACH transmission alone or in combination with the SRS transmission; and
transmitting, in response to the PRACH transmission received on the secondary cell, on the PCell, a random access response (RAR), wherein the RAR includes a timing advance to adjust a timing of the WTRU for the SCell.

6. The method of claim 5 wherein the RAR includes a timing advance to adjust a timing of a plurality of SCells and not the PCell.

7. The method of claim 6 wherein the plurality of SCells are in a same timing advance group.

8. The method of claim 5 wherein the PDCCH order includes an indication of a dedicated preamble and a PRACH mask index.

9. A method for uplink timing alignment in a wireless transmit/receive unit (WTRU), the method comprising:
receiving on a primary cell (PCell), a physical downlink control channel (PDCCH) order; wherein the PDCCH order includes a carrier indicator field indicating a secondary cell (SCell) to transmit a physical random access channel (PRACH) transmission and the PDCCH order is received using a downlink control information (DCI) format 1A;
in response to receiving the PDCCH order:
on a condition that the PRACH transmission coincides with a scheduled sounding reference signal (SRS) transmission, determining whether to drop the scheduled SRS transmission; and
on a condition a determination is made to drop the scheduled SRS transmission, transmitting the PRACH transmission without the SRS transmission;
on a condition a determination is made to transmit the scheduled SRS transmission, transmitting the PRACH transmission with the SRS transmission;
in response to transmitting the PRACH transmission, monitoring the PCell for a random access response (RAR); and
in response to detecting a RAR associated with the PRACH transmission, adjusting a timing for the SCell in accordance with a timing advance included in the detected RAR.

10. The method of claim 9 wherein in response to detecting the RAR associated with the PRACH transmission, the timing of a plurality of SCells is adjusted in response to the timing advance and the PCell timing is not adjusted in response to the timing advance.

11. The method of claim 10 wherein the plurality of SCells are in a same timing advance group.

12. The method of claim 9 wherein the PDCCH order includes an indication of a dedicated preamble and a PRACH mask index.

13. A wireless transmit/receive unit (WTRU) comprising:

a receiver configured to receive, on a primary cell (PCell), a physical downlink control channel (PDCCH) order; wherein the PDCCH order includes a carrier indicator field indicating a secondary cell (SCell) to transmit a physical random access channel (PRACH) transmission and the PDCCH order is received using a downlink control information (DCI) format 1A;

circuitry, in response to the received PDCCH order, configured to, on a condition that the PRACH transmission coincides with a scheduled sounding reference signal (SRS) transmission, determine whether to drop the scheduled SRS transmission; and a transmitter configured to, on a condition a determination is made to drop the scheduled SRS transmission, transmit the PRACH transmission without the SRS transmission;

the transmitter further configured to, on a condition a determination is made to transmit the scheduled SRS transmission, transmit the PRACH transmission with the SRS transmission;

the receiver and the circuitry configured to, in response to the transmitted PRACH transmission, monitor the PCell for a random access response (RAR); and the circuitry, in response to detecting a RAR associated with the PRACH transmission, configured to adjust a timing for the SCell in accordance with a timing advance included in the detected RAR.

14. The WTRU of claim 13 wherein in response to detecting the RAR associated with the PRACH transmission, the circuitry is configured to adjust a timing of a plurality of SCells in response to the timing advance and the PCell timing is not adjusted in response to the timing advance.

15. The WTRU of claim 14 wherein the plurality of SCells are in a same timing advance group.

16. The WTRU of claim 13 wherein the PDCCH order includes an indication of a dedicated preamble and a PRACH mask index.

* * * * *